US012718388B2

(12) United States Patent
Shen et al.

(10) Patent No.: US 12,718,388 B2
(45) Date of Patent: Aug. 25, 2026

(54) NON-LINE-OF-SIGHT IMAGING VIA NEURAL TRANSIENT FIELD

(71) Applicant: SHANGHAITECH UNIVERSITY, Shanghai (CN)

(72) Inventors: Siyuan Shen, Shanghai (CN); Zi Wang, Shanghai (CN); Shiying Li, Shanghai (CN); Jingyi Yu, Shanghai (CN)

(73) Assignee: SHANGHAITECH UNIVERSITY, Shanghai (CN)

(*) Notice: Subject to any disclaimer, the term of this patent is extended or adjusted under 35 U.S.C. 154(b) by 336 days.

(21) Appl. No.: 18/574,049

(22) PCT Filed: Jul. 5, 2021

(86) PCT No.: PCT/CN2021/104609
§ 371 (c)(1),
(2) Date: Dec. 25, 2023

(87) PCT Pub. No.: WO2023/279249
PCT Pub. Date: Jan. 12, 2023

(65) Prior Publication Data
US 2024/0202948 A1 Jun. 20, 2024

(51) Int. Cl.
*G06T 7/521* (2017.01)
*G01S 7/4865* (2020.01)
*G01S 17/42* (2006.01)
*G01S 17/894* (2020.01)
(Continued)

(52) U.S. Cl.
CPC ........... *G06T 7/521* (2017.01); *G01S 7/4866* (2013.01); *G01S 17/42* (2013.01); *G01S 17/894* (2020.01); *G06T 7/557* (2017.01); *G06T 7/77* (2017.01); *G06T 2207/10028* (2013.01);
(Continued)

(58) Field of Classification Search
None
See application file for complete search history.

(56) References Cited

U.S. PATENT DOCUMENTS

2012/0075423 A1 3/2012 Kirmani et al.
2020/0226783 A1* 7/2020 Chandran ................ G06T 7/70

FOREIGN PATENT DOCUMENTS

CN 108335324 A 7/2018
CN 111340929 A 6/2020
(Continued)

OTHER PUBLICATIONS

A. Velten, Andreas, et al. ("Recovering three-dimensional shape around a corner using ultrafast time-of-flight imaging." Nature communications 3.1 (published Mar. 20, 2012): Article No. 745, pp. 1-8) (Year: 2012).*

(Continued)

*Primary Examiner* — Leon Viet Q Nguyen
(74) *Attorney, Agent, or Firm* — Bayramoglu Law Offices LLC

(57) ABSTRACT

A novel neural modeling framework Neural Transient Field (NeTF) is provided for non-line-of-sight (NLOS) imaging. NeTF recovers the 5D transient function in both spatial location and direction, and the training data input is parametrized on the spherical wave-fronts. A Markov chain Monte Carlo (MCMC) algorithm is used to account for sparse and unbalanced sampling in NeTF.

18 Claims, 14 Drawing Sheets

(51) Int. Cl.
*G06T 7/557* (2017.01)
*G06T 7/77* (2017.01)

(52) U.S. Cl.
CPC ............... *G06T 2207/10052* (2013.01); *G06T 2207/20081* (2013.01); *G06T 2207/20084* (2013.01)

(56) References Cited

FOREIGN PATENT DOCUMENTS

| | | | |
|---|---|---|---|
| CN | 111462299 | A | 7/2020 |
| CN | 112598700 | A | 4/2021 |

OTHER PUBLICATIONS

B. Kirmani, Ahmed, et al. ("Looking around the corner using ultrafast transient imaging." International journal of computer vision, vol. 95, (published Jun. 23, 2011): pp. 13-28) (Year: 2011).*

Ahmed Kirmani, et al., Looking Around the Corner using Ultrafast Transient Imaging, Int J Comput Vis, 2011, pp. 13-28, vol. 95.

Ahmed Kirmani, et al., Looking Around the Corner using Transient Imaging, IEEE 12th International Conference on Computer Vision (ICCV), 2019, pp. 159-166.

Andreas Velten, et al., Recovering three-dimensional shape around a corner using ultrafast time-of-flight imaging, Nature Communications, 2012, pp. 1-8, 3:745.

Byeongjoo Ahn, et al., Convolutional Approximations to the General Non-Line-of-Sight Imaging Operator, Proceedings of the IEEE/CVF International Conference on Computer Vision, 2019, pp. 7889-7899.

Sean I. Young, et al., Non-line-of-sight Surface Reconstruction Using the Directional Light-cone Transform, IEEE/CVF Conference on Computer Vision and Pattern Recognition (CVPR), 2020, pp. 1404-1413.

Shumian Xin, et al., A Theory of Fermat Paths for Non-Line-of-Sight Shape Reconstruction, IEEE/CVF Conference on Computer Vision and Pattern Recognition (CVPR), 2019, pp. 6793-6802.

David B. Lindell, et al., Wave-Based Non-Line-of-Sight Imaging using Fast f-k Migration, ACM Trans. Graph., 2019, pp. 1-13, vol. 38 No. 4, Article 116.

* cited by examiner

One-stage

Two-stage

Two-stage with hierarchical sampling

NON-LINE-OF-SIGHT IMAGING VIA NEURAL TRANSIENT FIELD

CROSS REFERENCE TO THE RELATED APPLICATIONS

This application is the national phase entry of International Application No. PCT/CN2021/104609, filed on Jul. 5, 2021, the entire contents of which are incorporated herein by reference.

TECHNICAL FIELD

The present invention relates to the field of computer vision, and in particular, to non-line-of-sight imaging via neural transient field.

BACKGROUND

Non-line-of-sight (NLOS) imaging employs time-resolved measurements for recovering hidden scenes beyond the direct line of sight from a sensor. As an emerging computational imaging technique, NLOS imaging has been found to have broad applications in computer vision and computer graphics, ranging from recovering 3D shape of hidden objects to tracking hidden moving objects.

Most existing NLOS setups employ an ultra-fast pulsed laser beam towards a relay wall in the line of sight, where the wall diffuses the laser into spherical wavefronts towards the hidden scene. As the wavefront hits the scene and bounces back onto the wall, a time-of-flight (ToF) detector with picosecond resolution (such as the streak camera or the recent more affordable single-photon avalanche diodes (SPADs)) can be used to record the arrival time and the number of the returning photons. SPAD sensors in a time-correlated single photon counting (TCSPC) mode can produce transients, of which a single pixel corresponds to a specific pair of illumination and detection spots on the wall, in the form of a histogram of photon counts versus time bins. The measured transients contain rich geometric information of a hidden scene, potentially useful for scene recovery. The process corresponds to a typical inverse imaging problem that generally incurs high computational cost, since the transients are high dimensional signals.

To solve the computation problem, the pioneering back-projection (BP) technique and its variations assume smooth objects so that scene recovery can be modeled as deconvolution. Alternatively, the light-cone transform (LCT) based techniques collocate the illumination and sensing spots on the relay wall so that the forward imaging model can be simplified as 3D convolution, where advanced signal processing techniques such as Wiener filters can be used to further reduce noises. Assuming that the scene is near diffuse, analysis-by-synthesis algorithms can improve reconstruction. Fermat path based techniques can handle highly specular objects by simultaneously recovering the position and normal of Fermat points on the surface.

Existing NLOS methods can be categorized into confocal settings and non-confolcal settings. For example, Kirmani et al. designed and implemented the first prototype non-confocal NLOS system and derived a linear time-invariant model amenable to multi-path light transport analysis. See A. Kirmani, T. Hutchison, and J. a. Davis, "Looking around the corner using ultrafast transient imaging," International Journal of Computer Vision, vol. 95, no. 1, pp. 13-28, 2011; A. Kirmani, J. Davis, and R. Raskar, "Looking around the corner using transient imaging," in 2009 IEEE 12th International Conference on Computer Vision, 2009, pp. 159-166. In practice, varying both the laser beam and the measuring spots can yield a high-dimensional transient field analogous to the light field. Many efforts have focused on imposing priors and constraints to accelerate data processing. For example, Velten et al. proposed a back-projection technique with ellipsoidal constraints, where the observing point and the laser projection point on the wall correspond to the foci of a set of ellipsoids, each of which corresponds to a specific transient. See A. Velten, T. Willwacher, O. Gupta, A. Vecraraghavan, M. G. Bawendi, and R. Raskar, "Recovering three-dimensional shape around a corner using ultrafast time-of-flight imaging," Nature Communications, vol. 3, no. 1, p. 745, 2012. Then the hidden scene can be reconstructed by intersecting the ellipsoids. To further improve the reconstruction quality and speed, filtering techniques such as sharpening and thresholding have been applied. Alternatively, the scene can be directly modeled using parametric surfaces and then optimize the parameters over the observations. For example, Ahn et al. model parameter fitting as a linear least-squares problem using a convolutional Gram operator. See B. Ahn, A. Dave, A. Veeraraghavan, I. Gkioulekas, and A. C. Sankaranarayanan, "Convolutional approximations to the general non-line-of-sight imaging operator," in Proceedings of the IEEE/CVF International Conference on Computer Vision, 2019, pp. 7889-7899. It is also possible to adopt wave optics for NLOS imaging by characterizing the problem as specific properties of a temporally evolving wave field in the Fourier domain.

To reduce the dimensions of data, several recent approaches have adopted a confocal setting where the laser and the detector (e.g., a SPAD) collocate, e.g., via a beam splitter. FIG. 1 is a schematic diagram of a typical confocal NLOS imaging system in related art. Consequently, the ellipsoidal constraints are degenerated to be spherical, thereby simplifying the inverse problem with a 3D deconvolution and system calibration. The seminal work of light-cone transform (LCT) casts the NLOS reconstruction problem as Wiener filtering in the Fourier domain and can achieve a low computational complexity of $O(N^3 \log N)$ for $N^3$ voxels, compared to that of $O(N^5)$ in the traditional BP methods. Yong et al. formulate the albedo and normal recovery based on directional LCT (DLCT) as a vector deconvolution problem. See S. I. Young, D. B. Lindell, B. Girod, D. Taubman, and G. Wetzstein, "Non-line-of-sight surface reconstruction using the directional light-cone transform," in Proceedings of the IEEE/CVF Conference on Computer Vision and Pattern Recognition, 2020, pp. 1407-1416. The confocal setting makes a great contribution to direct light to firstly bounce off the diffuse wall and subsequently produces useful geometric constraints. The seminal work by Xin et al. exploit the Fermat flow induced by the transients for estimating surface normals. See S. X. Gkioulekas, S. Nousias, K. N. Kutulakos, A. C. Sankaranarayanan, S. G. Narasimhan, and Ioannis, "A theory of fermat paths for non-line-of-sight shape reconstruction," Proceedings of (CVPR) Computer Vision and Pattern Recognition, 2019. Lindell et al. adapts an F-K migration in seismology to convert the surface reconstruction problem to a boundary value problem. See D. B. Lindell, G. Wetzstein, and M. O'Toole, "Wave-based non-line-of-sight imaging using fast f-k migration," Acm Transactions on Graphics, vol. 38, no. 4, 2019. The F-K migration method enables faster reconstruction and supports planar or nonplanar diffuse walls.

Existing NLOS methods can also be categorized based on the forms of the reconstruction results. Two mostly adopted forms are volume density and points/surfaces. Methods for recovering the volume density generally discretize the scene into voxels and then compute the density, either by using intersections of wavefronts under ellipsoidal and spherical constraints, or by modeling the imaging process as convolution and recovering the volume via specially designed deconvolution filters. Methods for recovering the points/surfaces have relied on light transport physics for optimizing the shape and reflectance of the hidden scenes. Such methods are generally mathematically tractable but are computationally expensive since higher order geometry such as the surface normal needs to be integrated into the optimization process. Reconstruction results are either sparse where only discontinuities in the transient are used, or the results rely heavily on the quality of the basis shape.

Existing methods have obtained relatively good NLOS reconstruction results, however, nonlinear phenomena such as self-occlusion and non-Lambertian surface reflectance in imaging are often not taken into account, resulting in failure of recovering fine details of the NLOS scene. Such issue can be addressed by the novel volumetric NLOS imaging framework neural transient filed (NeTF) provided in the present invention, which models the transient field via deep networks. In NeTF, volumetric transient field is formulated under a spherical coordinate and a trained multi-layer perceptron (MLP) is devised to predict per-voxel density and view-dependent albedo. Different from the prior art, the trained MLP provides a continuous 5D representation of the hidden scene without digitizing the NLOS volume or optimizing surface parameters, and can handle view-dependent albedo of non-Lambertian surface reflectance and strong self-occlusions, under both confocal and non-confocal setups.

It is to be noted that the above information disclosed in this Background section is only for facilitating the understanding of the background of this invention, and may contain information that is not known to a person of ordinary skill in the art.

SUMMARY

In view of the limitations of existing technologies described above, the present invention provides a computer-implemented method for imaging a non-line-of-sight scene to address the aforementioned limitations. Additional features and advantages of this invention will become apparent from the following detailed descriptions.

One aspect of the present invention is directed to a computer-implemented method for imaging a non-line-of-sight (NLOS) scene. The method may include: encoding, by a computing system, a neural transient field onto a Multi-Layer Perceptron (MLP), wherein the neural transient field represents the NLOS scene as a continuous 5D function of transients; feeding a plurality of transient pixels captured by a time-resolved detector from a plurality of detection spots on a relay wall to the MLP; outputting a volume density and a surface reflectance along a direction by the MLP in accordance with the plurality of transient pixels; and reconstructing the NLOS scene in accordance with the volume density and the surface reflectance.

In some embodiments, each transient pixel may be parameterized using spherical coordinates with respect to a detection spot on the relay wall. The method may further include: transforming the spherical coordinates of the transient pixels into corresponding Cartesian coordinates.

In some embodiments, the method may further include: employing positional encoding (PE) technique to map each transient pixel to a multiple dimensional Fourier domain.

In some embodiments, the multiple dimensional Fourier domain may be in a range of 4 to 10.

In some embodiments, the MLP may comprise nine 256-channel layers and one 128-channel layer.

In some embodiments, the method may further include: outputting a feature vector.

In some embodiments, the method may further include: reconstructing the NLOS scene in accordance with $$\tau(x', y', t) = \Gamma_0 \iint_{H\left(x', y'; \frac{ct}{2}\right)} \frac{\sin\theta}{r^2} \sigma(r, \theta, \phi; x', y') \rho(r, \theta, \phi; x', y') \cdot \exp\left(2\int_0^r -A\sigma d\ r'\right) d\ \theta d\ \phi$$

wherein τ(x',y',t) represents the transient at a time instant t;

$$\Gamma_0 = Aar_0^2 E_P / \pi$$

corresponds to a constant term of particle radius a, initial energy $E_P$, and patch radius $r_0$; the integration domain $$H\left(x', y'; \frac{ct}{2}\right)$$

is a hemisphere centered at the detection spot P(x';y') on the relay wall with a radius of $$r = \frac{ct}{2};$$

θ and ϕ are angles of elevation and azimuth in the direction from P(x';y') to the transient pixel; σ(r,θ,ϕ;x',y') represents the density, and ρ(r,θ,ϕ;x',y') models the surface reflectance.

In some embodiments, the method may further include: reconstructing the NLOS scene in accordance with $$\tau(x', y', t) = \Gamma_0 \iint_{H\left(x', y'; \frac{ct}{2}\right)} \frac{\sin\theta}{r^2} \sigma(r, \theta, \phi; x', y') \rho(r, \theta, \phi; x', y') d\theta d\phi$$

In some embodiments, the method may further include: reconstructing the NLOS scene in accordance with $$\tau(P, P', t) = \iiint_{\Omega} \frac{1}{r_1^2} E_P \cdot \delta(2\gamma\cosh\mu - ct) J d\mu d\nu d\varphi$$

wherein τ(P,P',t) represents the transient at the time instant t; P and P' represent a illumination spot and the detection spot on the relay wall, respectively; with respect to a NLOS scene point Q, $r_1$ and $r_2$ correspond to the distance from P to Q and Q to P', respectively; a length of optical path Y: P→Q→P' equals to $r_1+r_2=ct$; focal length is $\gamma=|\overrightarrow{OP}-\overrightarrow{OP'}|$; $E_{P'}$ represents an energy received at P' from Q; (μ,ν,φ) are ellipsoidal coordinates; and/represents Jacobian from the Cartesian coordinates.

In some embodiments, the method may further include: reconstructing the NLOS scene in accordance with $$\tau(P, P', t) = \Gamma_0 \int\int_E \frac{J}{r_1^2 r_2^2} \sigma(\mu, v, \varphi)\rho(\mu, v, \varphi, P, P')dvd\varphi$$

wherein $\mu = \text{arccosh}(ct/2\gamma)$.

In some embodiments, the method may further include: predicting the plurality of transient pixels based on the volume density and the surface reflectance.

In some embodiments, the method may further include: calculating a loss function between the estimated transient pixels and the captured transient pixels.

In some embodiments, the method may further include: capturing a plurality of new transient pixels by the time-resolved detector from a plurality of new detection spots on the relay wall in accordance with the loss function as a probability density function (PDF); feeding the plurality of new transient pixels captured to the MLP; outputting the volume density and the surface reflectance along the direction by the MLP in accordance with the plurality of new transient pixels; and reconstructing the NLOS scene in accordance with the volume density and the surface reflectance.

In some embodiments, the decreasing speed of the loss function may be less than $(L_i - L_{i+1})/L_i < 10^{-4}$, wherein L represents the loss function.

In some embodiments, the method may further include: selecting a plurality of first transient pixels from the plurality of transient pixels and sampling the first transient pixels by the MLP; predicting the plurality of first transient pixels based on the volume density and the surface reflectance; calculating the loss function between the estimated first transient pixels and the captured first transient pixels; and selecting a plurality of second transient pixels from the plurality of transient pixels and sampling the plurality of second transient pixels in accordance with the loss function as the probability density function (PDF).

In some embodiments, the method may further include: outputting the volume density and the surface reflectance along the direction by the MLP in accordance with the plurality of second transient pixels; and reconstructing the NLOS scene in accordance with the volume density and the surface reflectance.

In some embodiments, the selecting a plurality of second transient pixels from the plurality of transient pixels may further include: employing a Markov chain Monte Carlo (MCMC) algorithm in accordance with $$\tau_f(x', y', t) = \frac{1}{r^4} \sum_{i,j} \frac{\sigma(r, \theta_{f,ij}, \phi_{f,ij}; x', y')\rho(r, \theta_{f,ij}, \phi_{f,ij}; x', y')}{K(\theta_{f,ij}, \phi_{f,ij})}$$

wherein $\tau_f(x',y',t)$ is the transient based on the second transient pixels; $K(\theta_{f,ij},\phi_{f,ij})$ is the probability density function; $\sigma(r,\theta_{f,ij},\phi f_{f,ij};x',y')$ represents the density; and $\rho(r,\theta_{f,ij},\phi_{f,ij}x',y')$ models the surface reflectance.

In some embodiments, the method may further include: reconstructing the NLOS scene using the first transient pixels and the second transient pixels in accordance with:

$$\tau(x', y', t) = \frac{\tau_c(x', y', t) + \tau_f(x', y', t)}{2}$$

wherein $\tau_c(x',y',t)$ is the transient based on the first transient pixels.

The foregoing general description and the following detailed description are merely examples and explanations and do not limit the present invention.

BRIEF DESCRIPTION OF THE DRAWINGS

The accompanying drawings, which are incorporated in and constitute a part of the description, illustrate embodiments consistent with this invention and, together with the description, serve to explain the disclosed principles. It is apparent that these drawings present only some embodiments of this invention and those of ordinary skill in the art may obtain drawings of other embodiments from them without exerting any creative effort.

DETAILED DESCRIPTION OF THE EMBODIMENTS

Exemplary embodiments will now be described more fully with reference to the accompanying drawings. However, these exemplary embodiments can be implemented in many forms and should not be construed as being limited to those set forth herein. Rather, these embodiments are presented to provide a full and thorough understanding of this invention and to fully convey the concepts of the exemplary embodiments to others skilled in the art.

In addition, the described features, structures, and characteristics may be combined in any suitable manner in one or more embodiments. In the following detailed description, many specific details are set forth to provide a more thorough understanding of this invention. However, those skilled in the art will recognize that the various embodiments can be practiced without one or more of the specific details or with other methods, components, materials, or the like. In some instances, well-known structures, materials, or operations are not shown or not described in detail to avoid obscuring aspects of the embodiments.

The present invention is inspired by the recent multi-view reconstruction framework Neural Radiance Field (NeRF) that aims to recover the density and color at every point along every ray, implicitly providing a volumetric reconstruction. Different from existing multi-view stereo (MVS) techniques, NeRF adopts a volume rendering model and sets out to optimize volume density that best matches the observation using a MLP. Additionally, NeRF can be modified to tackle photometric stereo (PS) problems where the cameras are fixed but the lighting conditions vary.

Figure 1:
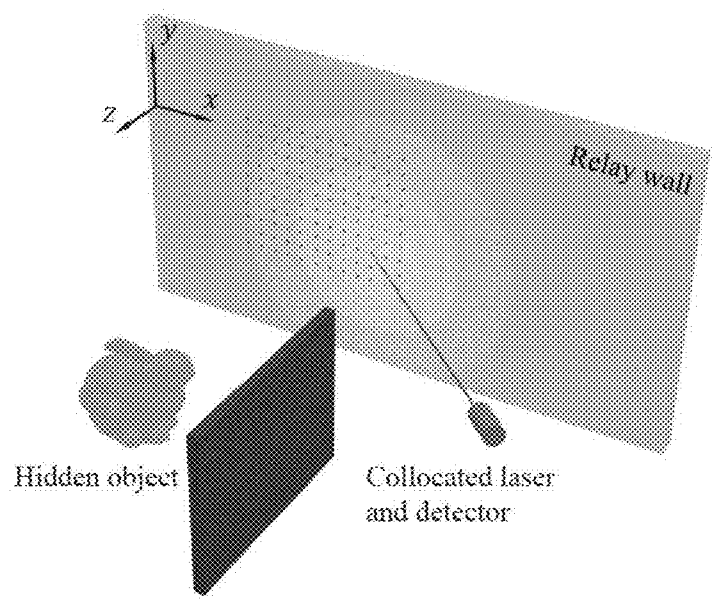
FIG. 1 is a schematic diagram of a typical confocal NLOS imaging system in related art.
Figure 2:
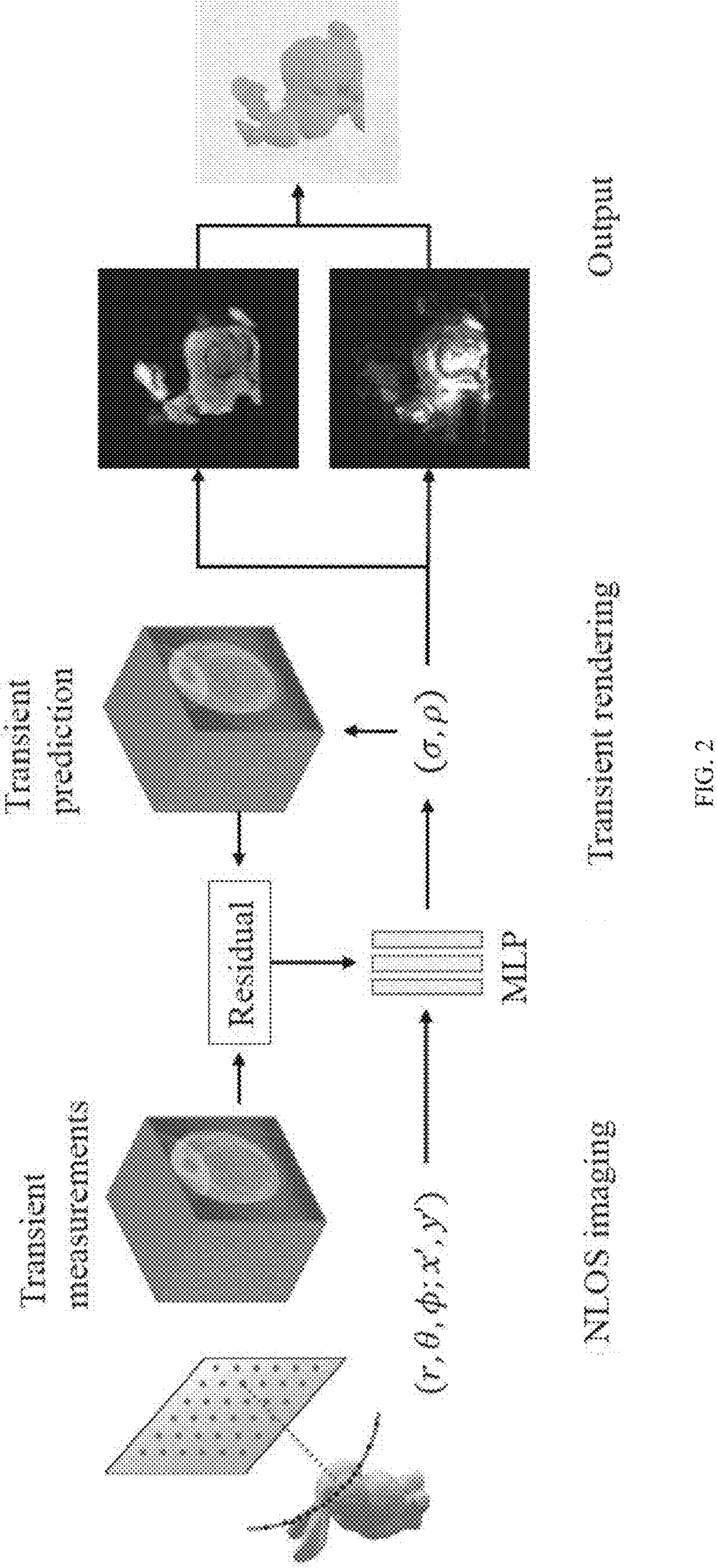
FIG. 2 is a schematic diagram of the neural transient field (NeTF) reconstruction pipeline according to an embodiment of the present invention.

It is observed that the non-confocal NLOS imaging process greatly resembles MVS/PS. In particular, fixing the laser beam and measuring the transient at different spots on the wall resembles MVS, while fixing the measuring spot and varying the laser beam resembles PS. Additionally, the confocal setting is very similar to the NeRF AA setting, where the lighting and the cameras move consistently. Therefore, a similar deep learning technique is provided in the present invention for scene recovery, and such reconstruction scheme is called Neural Transient Field or NeTF. FIG. 2 is a schematic diagram of the NeTF reconstruction pipeline.

Figure 3A:
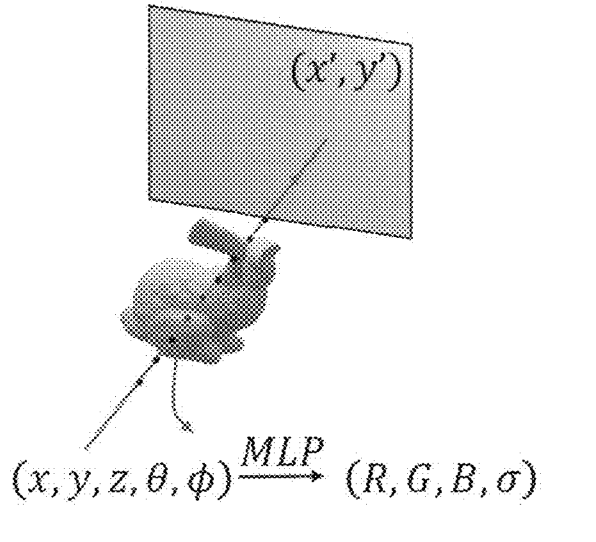
FIGS. 3A and 3B show the differences between NeRF and NeTF.
Figure 3B:
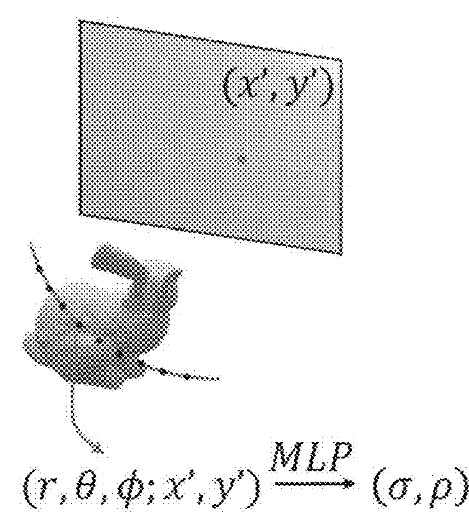

Both NeTF and NeRF use MLP as an optimizer. However, there are several major differences between NeRF and NeTF. FIGS. 3A and 3B show the differences between NeRF and NeTF. First, the volume rendering model used in NeRF is not directly applicable to NeTF. Therefore, a novel volumetric image formation model is devised under NeTF. Second, NeTF measures the transient rather than the radiance. Referring to FIGS. 3A and 3B, radiance is measured on a single ray in NeRF, while transient is measured on a spherical wavefront in NeTF. Hence, a spherical volume reconstruction pipeline is formulated. Finally, compared with NeRF, NeTF captures a much sparser set of viewpoints and the distribution of scene points on the spherical wavefronts can be highly uneven. Accordingly, a Markov chain Monte Carlo (MCMC) technique is introduced based on the importance of sampling points in matching the actual scene distribution to improve the robustness in the reconstruction.

1. Scene Representation

With respect to the volume rendering model, neural radiance field $L(x,y,z,\theta,\phi)$ is used in the NeRF framework as scene representation, where $(x,y,z)$ corresponds to a point on a ray and $(\theta,\phi)$ corresponds to the direction of the ray. The outputs of the trained network are the density $\sigma$ at every position $(x,y,z)$ and the view-dependent color $c=(r,g,b)$ along a direction $(\theta,\phi)$. The density can be further used for scene reconstruction and the color can be used for image-based rendering.

In the present invention, instead of sampling on a single camera ray, a hemisphere of rays are sampled in NeTF as light propagates as a spherical wave from the relay wall towards the hidden scene. Referring to FIG. 2, a continuous 5D function of transients $L_{NLOS}$ is adopted under spherical coordinates as:

$$L_{NLOS}(x', y', r, \theta, \phi) \rightarrow (\sigma, \rho) \quad (1)$$

where $P(x',y')$ is a detection spot on the wall that serves as the origin of the hemisphere, and $Q(r,\theta,\phi)$ is a scene point parameterized using the spherical coordinate $(r,\theta,\phi)$ with respect to $P(x',y')$. Similar to NeRF, a fully connected neural network (i.e., an MLP) is designed to estimate $L_{NLOS}$. Different from NeRF, the outputs of $L_{NLOS}$ in NeTF are volume density $\sigma$ and surface reflectance (albedo $\rho$), rather than color along the direction $(\theta,\phi)$.

Different spots need to be scanned on the relay wall in NLOS can result in inconsistent spherical coordinates and pose challenges in network training and inference. Therefore, the spherical coordinates $(x',y',r,\theta,\phi)$ are first transformed to their corresponding Cartesian coordinates, i.e., $(x,y,z,\theta,\phi)$ as:

$$R: \begin{cases} x = r\sin\theta\cos\phi + x' \\ y = r\sin\theta\cos\phi + y' \\ z = r\cos\theta \end{cases} \quad (2)$$

The transform R ensures that the position of a 3D voxel is consistent when scanning from different detection spots. All subsequent training under MLP should be conducted under the Cartesian coordinate for density and view dependent albedo inferences.

$$L_{NLOS}: (x', y', r, \theta, \phi) \xrightarrow{R} (x, y, z, \theta, \phi) \xrightarrow{MLP} (\sigma, \rho) \quad (3)$$

Like NeRF, a key benefit of NeTF is that there's no need to discretize the scene into a fixed-resolution volume representation. Instead, the deep network representation can provide scene reconstructions at an arbitrary resolution, and recover fine details largely missing in prior art.

2. Forward Model

In the present invention, the NLOS reconstruction problem is reformulated as a forward model under the NeTF representation. Under the confocal setting, the illumination and detection collocate at the same spot $P(x',y')$ on a relay wall, and produce a spherical wave anchored at the spot. The transient $\tau_{iso}(x',y',t)$ recorded at each spot $P(x',y')$ is the summation of photons that are reflected back at a specific time instant t from the NLOS scene in the 3D half-space $\Omega$ as:

$$\tau_{iso}(x', y', t) = \iiint_{\Omega} \frac{1}{r^4} \rho_{iso}(x, y, z) g(x', y', x, y, z) \cdot \delta\left(2\sqrt{(x'-x)^2 + (y'-y)^2 + z^2} - tc\right) dx\,dy\,dz \quad (4)$$

where c is the speed of light, r is the distance between the wall and the NLOS scene as $r=\sqrt{(x'-x)^2+(y'-y)^2+z^2}=tc/2$, $1/r^4$ is the light fall-off term, and $\rho_{iso}(x,y,z)$ is the albedo of an NLOS point (x, y, z are the spatial coordinates of the point). Function g models the time-independent effects, including the surface normal, bidirectional reflectance distribution functions (BRDFs), occlusions patterns, etc. The Dirac delta function relates the time of flight t to the distance r.

The function g makes the imaging process nonlinear. To solve this problem, existing linear approximation schemes adopt g=1, assuming that the NLOS scene scatters isotropically and that no occlusions occur within the NLOS scene. Such assumptions, however, restrict NLOS scenes to be Lambertian and convex. In contrast, NeTF, by adopting a deep network to model the imaging process, can tackle non-linearity without imposing explicit constraints on g.

In the NLOS setting in the present invention, photons travel along spherical wavefronts. When reaching either the relay wall or the hidden surface, the photons are reflected and then continue to propagate along a hemisphere. Since the scattering equation serves as the foundation for volume rendering under NeRF, in order to specify how much an NLOS point in the hemisphere contributes to the transient through photon propagation, a photon version of the scattering equation is derived in NeTF.

Figure 4:
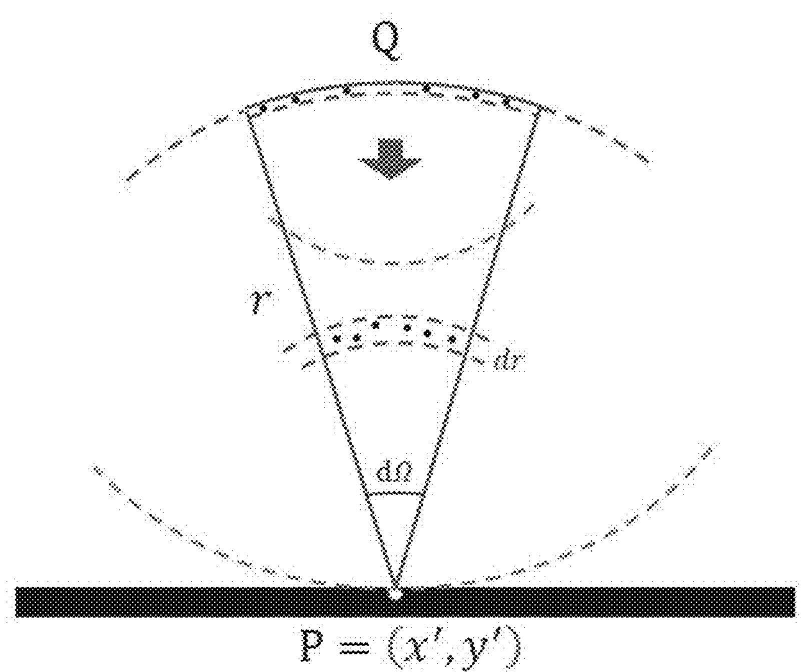
FIG. 4 is a schematic diagram of the volume rendering model in NeTF according to an embodiment of the present invention.

FIG. 4 is a schematic diagram of the volume rendering model in NeTF derived under the spherical coordinate system. Referring to FIG. 4, a detection spot P(x',y') with respect to an NLOS point Q(r,θ,ϕ) in a hemisphere is centered at P. It is assumed that the spot P is a patch with radius $r_0$, and that the location Q in the hidden scene with its neighbors that contribute to the transient at P forms a spherical cross-section with radius r, thickness d r, and a solid angle d Ω. In FIG. 4, photons travel from P to Q and back from Q to P. When d r is small enough, the inner and outer surface areas of the cross-section are $S=r^2 d\,\Omega$, and the volume is Sd r. Since σ is the density of particles in the cross-section, the number of particles is σSd r. Assuming that a particle has a radius a, the projected area on the surface can then be computed as $A=\pi a^2$. Further assuming that light energy E is attenuated due to the absorption and scattering of the particles, the energy loss dE can be computed as:

$$d\,E = -\frac{\pi a^2 \sigma r^2 d\,\Omega d\,r}{r^2 d\,\Omega} E = -A\sigma E d\,r \tag{5}$$

The attenuation coefficient can be computed as $$e^{\int_0^r -A\sigma(r',\theta,\phi)d\,r'}$$

along the radius r. Given that the spot P has a radius $r_0$ and emits radiant energy as a constant $E_P$, by taking integral of Eqn. 5, energy received at Q can be defined as:

$$E_Q = \exp\left(\int_0^r -A\sigma(r',\theta,\phi)d\,r'\right) E_P \frac{r^2 \cdot d\,\Omega}{r^2 \cdot 2\pi} \tag{6}$$

When considering the reflection at Q and assuming that the cross-section is thin enough (e.g., d r=2a), the radiant energy at Q attenuated due to absorption and reflection with respect to the reflectance ρ can be defined as:

$$E'_Q(r,\theta,\phi) = A \cdot \sigma(\gamma,\theta,\phi) \cdot 2a \cdot \rho(r,\theta,\phi) \cdot E_Q \tag{7}$$

On the returning path from Q to P, the wavefront forming hemisphere is centered at Q with radius r. The spot P with area $$\pi r_0^2$$

receives the photons back to the relay wall, and the energy received at P with respect to the solid angle d Ω can be defined as:

$$E'_P(r,\theta,\phi) = \exp\left(\int_0^r -A\sigma(r',\theta,\phi)d\,r'\right) E'_Q \frac{r_0^2 \cdot 2\pi}{r^2 \cdot 2\pi} \tag{8}$$

By taking integral of Eqn. 8 with respect to the solid angle d Ω, the energy received at the detection spot P(x',y') in the hemisphere at a time instant t can be defined as:

$$\tau(x',y',t) = \iint_{H\left(x',y';\frac{ct}{2}\right)} E'_P(r,\theta,\phi)\,d\,\Omega \tag{9}$$

Eqn. 9 serves as the forward imaging model in NeTF, which essentially maps an NLOS point Q(r,θ,ϕ) to a transient t detected at a spot P(x',y') on a diffuse surface at a time instant t. For clarity, σ(r,θ,ϕ;x',y') is abbreviated as σ(r,θ,ϕ), and ρ(r,θ,ϕ;x',y') as ρ(r,θ,ϕ). Therefore, Eqn. 9 can be rewritten as:

$$\tau(x',y',t) = \Gamma_0 \iint_{H\left(x',y';\frac{ct}{2}\right)} \frac{1}{r^2}\sigma(r,\theta,\phi)\rho(r,\theta,\phi)\exp\left(2\int_0^r A\sigma d\,r'\right) d\,\Omega \tag{10}$$

where constant $$\Gamma_0 = Aar_0^2 E_P/\pi$$

is determined by particle radius a, initial energy $E_P$, and patch radius $r_0$. The integration domain $$H\left(x',y';\frac{ct}{2}\right)$$

is a hemisphere centered at P(x',y') on a relay wall, with a radius of r=ct/2. θ and ϕ are the elevation and azimuth angles in the viewing direction from P(x',y') to an NLOS point, equivalent to those in the direction of reflection from the NLOS scene. ρ(r,θ,ϕ;x',y') models view-varying BRDFs of the NLOS scene.

$$e^{\int_0^r -A\sigma(r',\theta,\phi)d\,r'}$$

is an exponential actuation coefficient and reveals the visibility of an NLOS point with respect to varying detection spots P(x',y'). Since dΩ=sin θd θd ϕ, Eqn. 10 can be rewritten as:

$$\tau(x', y', t) = \Gamma_0 \iint_{H\left(x', y'; \frac{ct}{2}\right)} \frac{\sin\theta}{r^2} \sigma(r, \theta, \phi)\rho(r, \theta, \phi) \cdot \exp\left(2\int_0^r A\sigma d\ r'\right) d\ \theta d\ \phi \tag{11}$$

The forward plenotpic transient field model in Eqn. 11 is computationally expensive if the MLP is used for training. Assuming that the NLOS scene is all opaque and does not exhibit self-occlusion, the formulation can be further simplified as:

$$\tau(x', y', t) = \Gamma_0 \iint_{H\left(x', y'; \frac{ct}{2}\right)} \frac{\sin\theta}{r^2} \sigma(r, \theta, \phi)\rho(r, \theta, \phi) d\ \theta d\ \phi \tag{12}$$

Such a simplified formulation can reduce computations and is used in the examples of FIGS. 6A-6C, 8A-8E, 9A-9E, 10A-10D, and 11A-11E to accelerate processing. However, the downside is that, unlike Eqn. 11, Eqn. 12 cannot handle occlusions. For scenes that contain heavy occlusion, Eqn. 11 should be used, such as shown in FIGS. 14A-14F.

Although both NeRF and NeTF derive the forward model based on volume rendering, NeRF models a ray propagates along a line (i.e., with a cylinder between two points) while NeTF models spherical wavefront propagation (i.e., with a cone model that accounts for attenuation). In addition, the volume rendering model used in NeRF only considers one-way accumulation, i.e., how light travels through light emitting particles towards the camera sensor. In contrast, NeTF in the present invention adopts a two-way propagation model, i.e., how light illuminates the scene and how the scene illuminates the wall.

3. Differentiable Rendering

The forward model provided in the present invention is differentiable. Therefore, the continuous integral Eqn. 12 can be numerically computed using quadrature, as:

$$\tau(x', y', t) = \frac{\Delta\theta\Delta\phi}{r^2} \sum_{i,j} \sin(\theta_{ij})\sigma(r, \theta_{ij}, \phi_{ij})\rho(r, \theta_{ij}, \phi_{ij}) \tag{13}$$

$Q(r,\theta_{ij},\phi_{ij})$ stands for scene points uniformly sampled along the hemispherical rays. These points are transformed into the corresponding Cartesian coordinates and serve as the inputs to the MLP. The outputs of the network are the density and reflectance at each point. Then all the outputs are summed as neural transient fields from the transients.

NeTF is further optimized by minimizing the following $l_2$-norm loss function serving as the difference between the predicted $\tau(x',y',t)$ transients and the measured $\tau_m(x',y',t)$ transients:

$$L = \sum_{x', y', t} (\tau_m(x', y', t) - \tau(x', y', t))^2 \tag{14}$$

The use of MLP allows the minimization of arbitrary losses as long as they are differentiable with respect to the predicted $\tau(x',y',t)$, although $l_2$-norm is most commonly adopted as in NeRF.

4. Two-Stage Training

The NeTF forward model can model the plenoptic transient field by using an MLP. However, data acquired by NeTF is quite different from that acquired by NeRF. In NeRF, a dense set of high resolution images are generally required to produce satisfactory density estimation and view interpolation. Under such dense viewpoint setting, the problem of occlusions is less significant as there are a sufficient number of views capturing the occluded points to ensure reliable reconstruction. In NeTF, however, the SPAD only captures a sparse set of spots on the wall and an occluded point may be captured only from a very small number of viewpoints (spots). Consequently, occlusion can lead to strong reconstruction artifacts if not handled properly. Such sampling bias resembles the long-tailed classification problem in machine learning. One solution is to resample the dataset to achieve a more balanced distribution by oversampling the minority classes. Therefore, a two-stage training strategy along with a hierarchical sampling technique is developed to address this sampling bias.

With respect to the two-stage training, the loss calculated from the first stage in the training process is used to guide resampling for the second stage. In particular, the training is first conducted using all samples to obtain an initial reconstruction, and the loss function between the predicted transients and measured transients is calculated at every detection spot on the relay wall. It is observed that spots that correspond to a high loss imply an undersampling. Therefore, the calculated loss is normalized to form a probability density function (PDF), and the integral of PDF on the whole domain is equal to 1. Next, the detection spots are resampled using the PDF based on a sampling scheme where a higher loss corresponding to a higher PDF indicates that a more dense sampling is required. A new training dataset is built using this sampling scheme, and the network is subsequently retrained to refine reconstruction. These two stages may be iterated until convergence. Specifically, during the training process, loss is decreased at a decreasing speed. When the decreasing speed is slow enough, the network is deemed to be converged. For example, denoting $L_i$ as the loss at ith training, if $(L_i - L_{i+1})/L_i < 10^{-4}$ is satisfied, the network is deemed to be converged. The two-stage training process provides a viable solution to tackle imbalanced sampling for achieving a more accurate reconstruction.

Figure 5C:
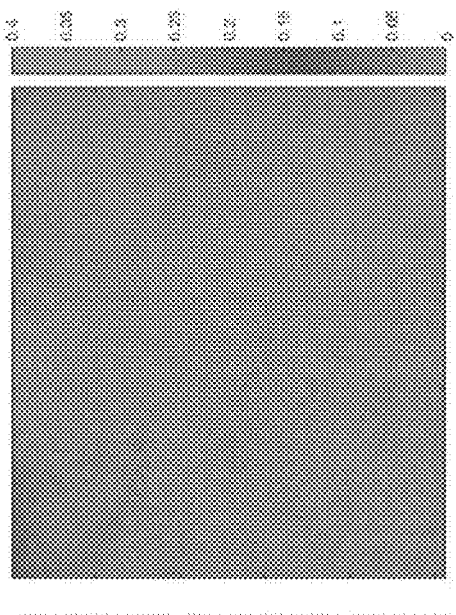
FIGS. 5A-5C show the two-stage training process used in NeTF according to an embodiment of the present invention.
Figure 5B:
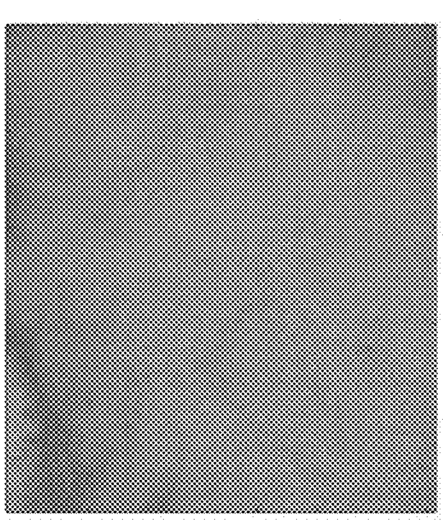
Figure 5A:
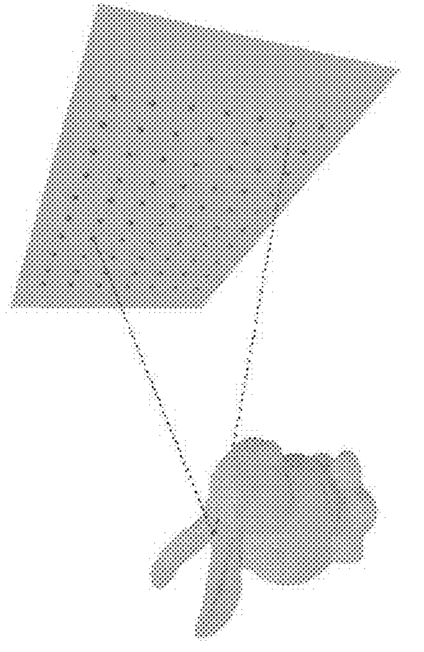

FIGS. 5A-5C show the two-stage training used in NeTF. FIG. 5A shows a bunny scene with 256×256 sampling spots on the relay wall. As shown in FIG. 5B, red spots in the loss map (and therefore a resampling density map) imply a high loss (and thus a high PDF in subsequent sampling) and blue spots imply a low one. FIG. 5C shows the final loss after applying resampling.

5. Hierarchial Sampling

Denser samples can produce a reconstruction of higher quality. However, they may lead to a much higher computation overhead. For example, by uniformly sampling L hemisperical wavefronts at each detection spot and $N^2$ scene points on each L, the resulting training process requires a computational complexity of $O(N^2L)$. The parameter N can be tuned, and usually have a value ranging from 8 to 64. Larger N leads to better imaging resolution but also more memory consumption. It's observed that under the confocal setting, spherical wavefronts only intersect with a very small portion of the NLOS scene. These wavefronts tend to conver at specific patches and contribute greatly to the final integral, while the contribution from the other portions are negligible. Thus, a hierarchical sampling is adopted in the NeTF, but the hierarchical sampling scheme in NeTF is different from that in NeRF. As discussed above, NeRF calculates the integral along a ray, i.e., using 1D sampling, while NeTF calculates on a hemisphere, i.e., using 2D sampling. Therefore, a coarse-to-fine sampling scheme is developed.

Specifically, $$N_c^2$$

uniform scene points are first sampled in the hemisphere and the coarse network is evaluated with the estimated PDF $k(\theta,\phi)$. Then Metropolis-Hastings algorithm and conditional Gaussian distribution are employed for state transition of Markov chain to produce a fine sampling of $N_f$ scene points with the PDF as $$K(\theta_{ij}^f, \phi_{ij}^f)$$

along the hemispherical wavefronts that intersect with the NLOS scene. Generally speaking, fine points are gathered around the coarse points with high volume density. After the coarse sampling is done, the density of the object at each sampling point is known by the neural network. Sampling points with very low density can be deemed to be irrelevant to the NLOS volume because they are not on the object, while those sampling points with high density are deemed to be relevant to the NLOS volume.

Finally, the coarse and fine samples are combined as $$N_c^2 + N_f$$

to improve the reconstruction quality of the fine network. Specifically, energy received at the detection spot P(x',y') in the hemisphere at a time instant t can be redefined as:

$$\tau(x', y', t) = \frac{\tau_c(x', y', t) + \tau_f(x', y', t)}{2} \tag{15}$$

where to $\tau_c$(x',y',t) is the integral with the coarse samples $$N_c^2,$$

and $\tau_f$(x',y',t) is estimated with fine samples $N_f$ from MCMC, as:

$$\tau_f(x', y', t) = \frac{1}{r^4} \sum_{i,j} \frac{\sigma(r, \theta_{ij}^f, \phi_{ij}^f)\rho(r, \theta_{ij}^f, \phi_{ij}^f)}{K(\theta_{ij}^f, \phi_{ij}^f)} \tag{16}$$

The hierarchical sampling in NeTF is intrinsically differentiable. Previous volume-based methods can theoratically apply such a hierarchical sampling technique to refine their reconstruction. However, these methods in practice use an explicit volumetric representation with a fixed resolution, making resampling on the hemisphere intractable.

Figure 6A:
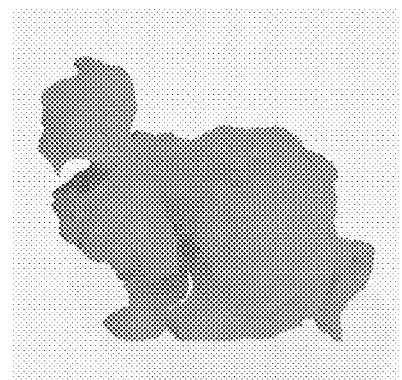
FIGS. 6A-6C show the reconstruction results obtained with different training process.
Figure 6B:
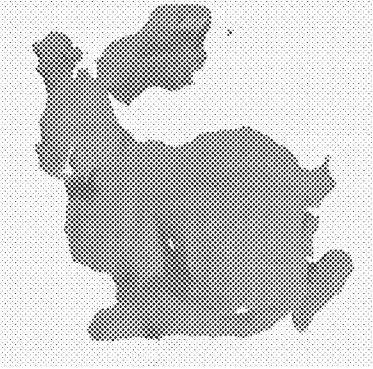
Figure 6C:
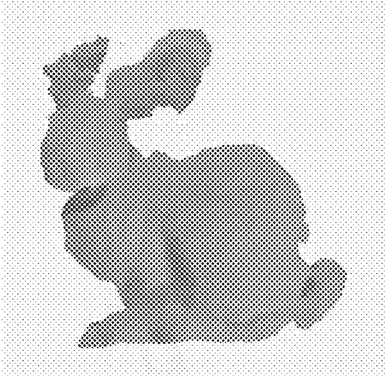

FIGS. 6A-6C show the reconstruction results obtained with different training process, namely the one-stage training, two-stage training without hierarchical sampling, and two-stage training with hierarchical sampling. As shown in FIG. 6A, most prior art adopting one-stage training fails to recover both ears of the Bunny. As shown in FIG. 6B, using the two-stage training, NeTF manages to recover fine details largely missing from the first-stage training, e.g., the ear of Bunny and details of the abdomen region. As shown in FIG. 6C, with hierarchical sampling, NeTF further improves the reconstruction of the bunney with more complete shape and more accurate silhouettes.

The NeTF implementation and experimental validations are further described below.

6. MLP Settings

Figure 7:
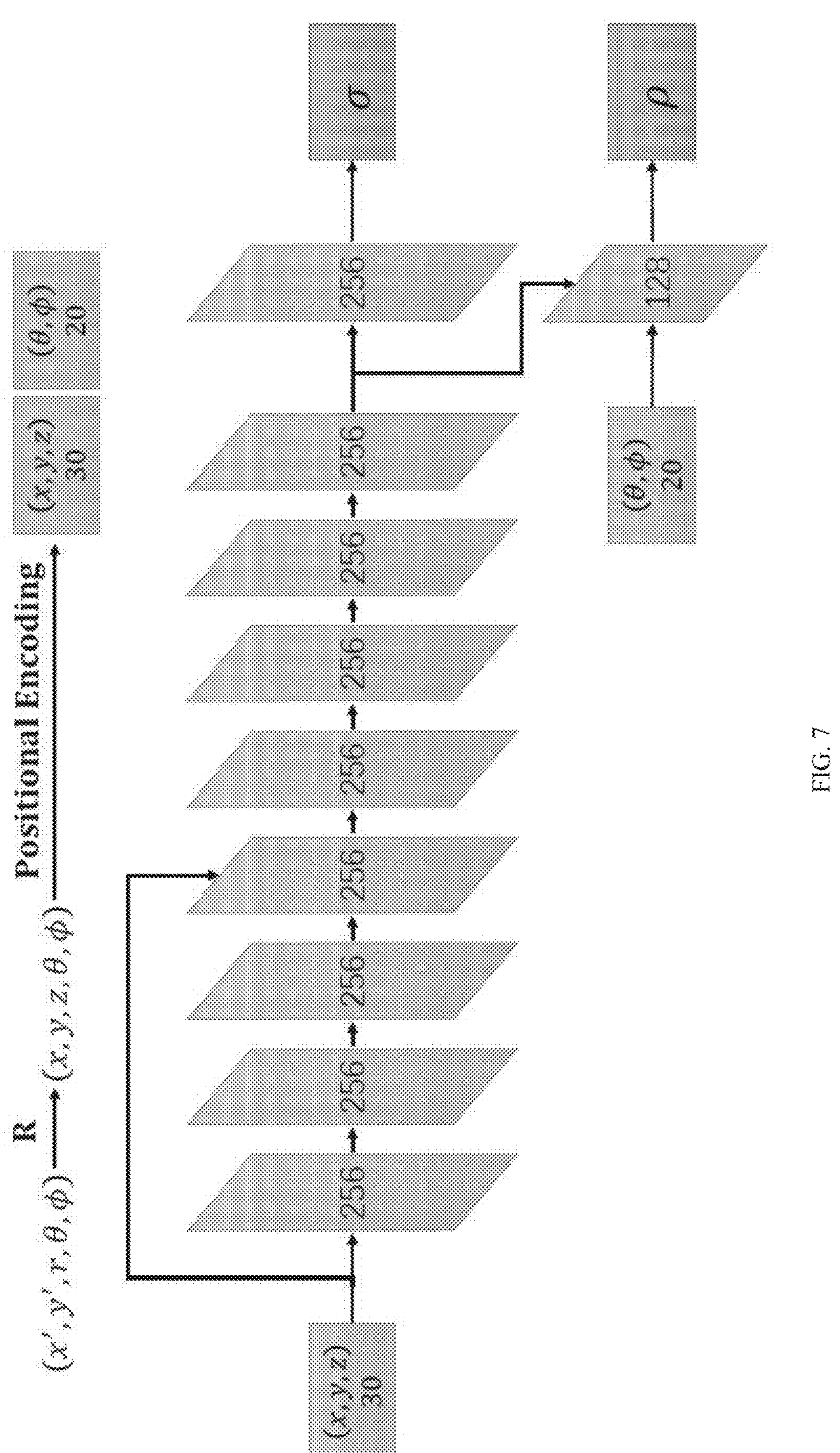
FIG. 7 is a schematic diagram of the structure of the MLP used in NeTF according to an embodiment of the present invention.
Figures 8A, 8B, 8C, 8D, 8E:
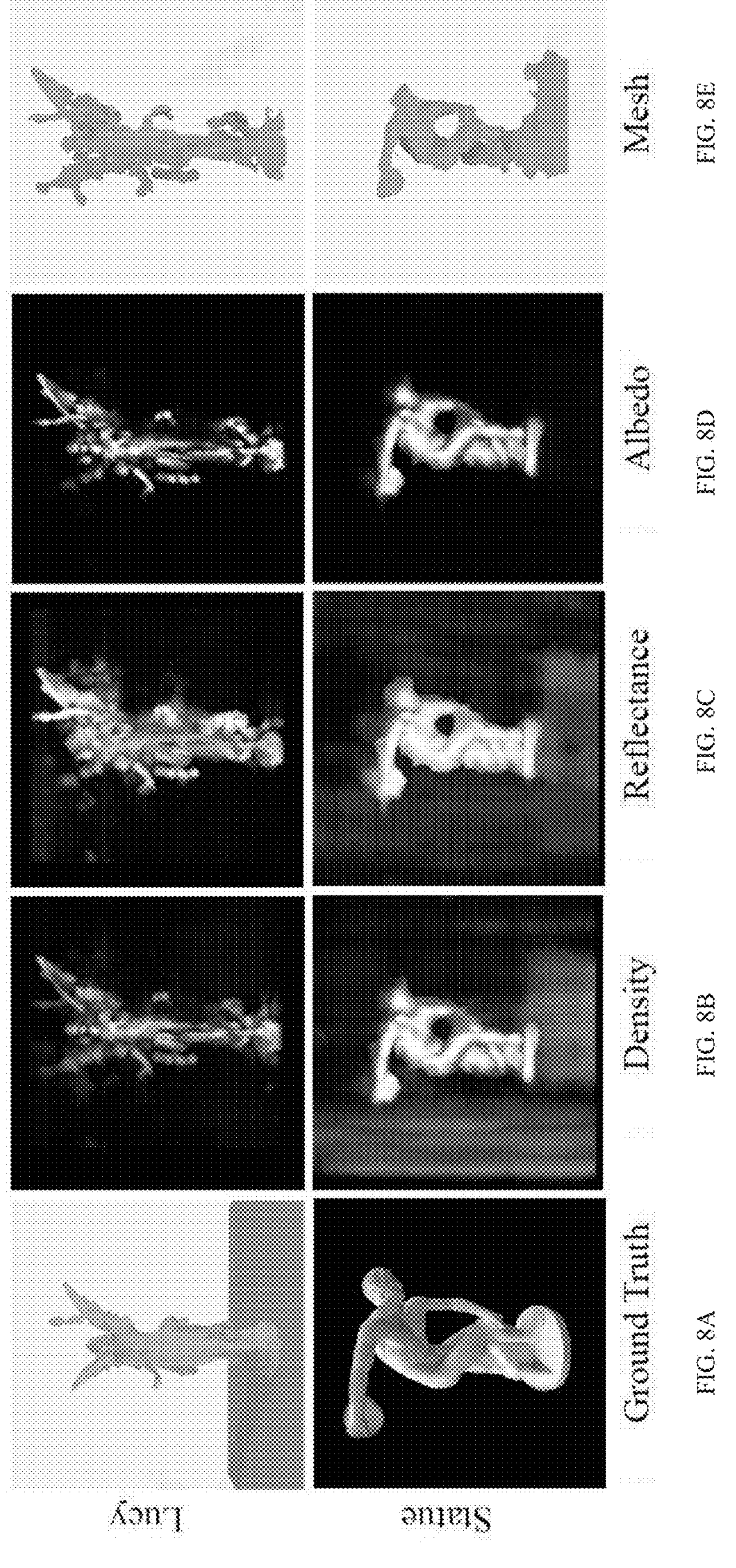
FIGS. 8A-8E show the results of the Lucy model and Statue model obtained by NeTF according to an embodiment of the present invention.
Figures 9A, 9B, 9C, 9D, 9E:
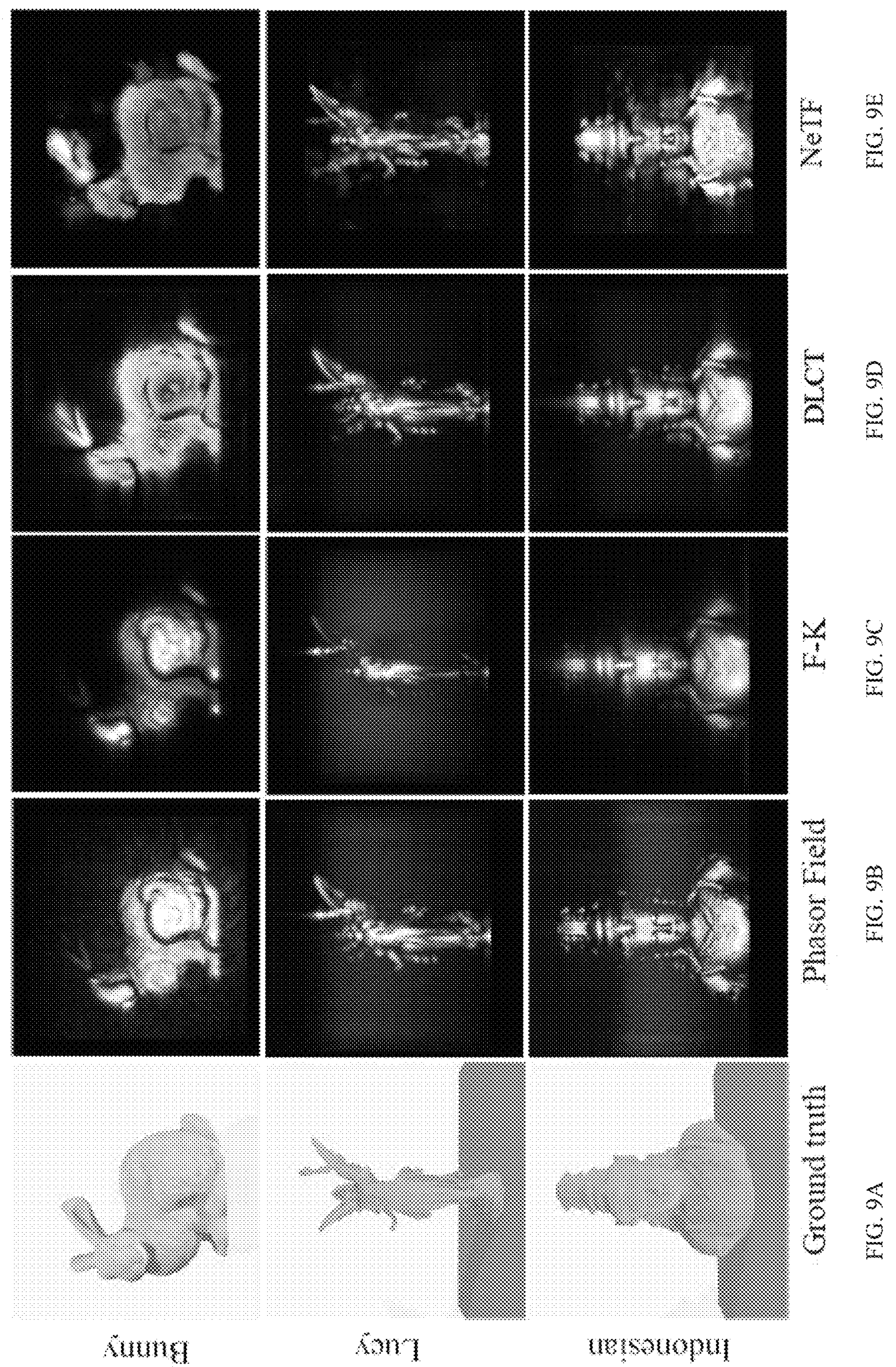
FIGS. 9A-9E show the comparison on the results of simulated NLOS dataset obtained by NeTF and state of the art (SOTA).
Figures 10A, 10B, 10C, 10D:
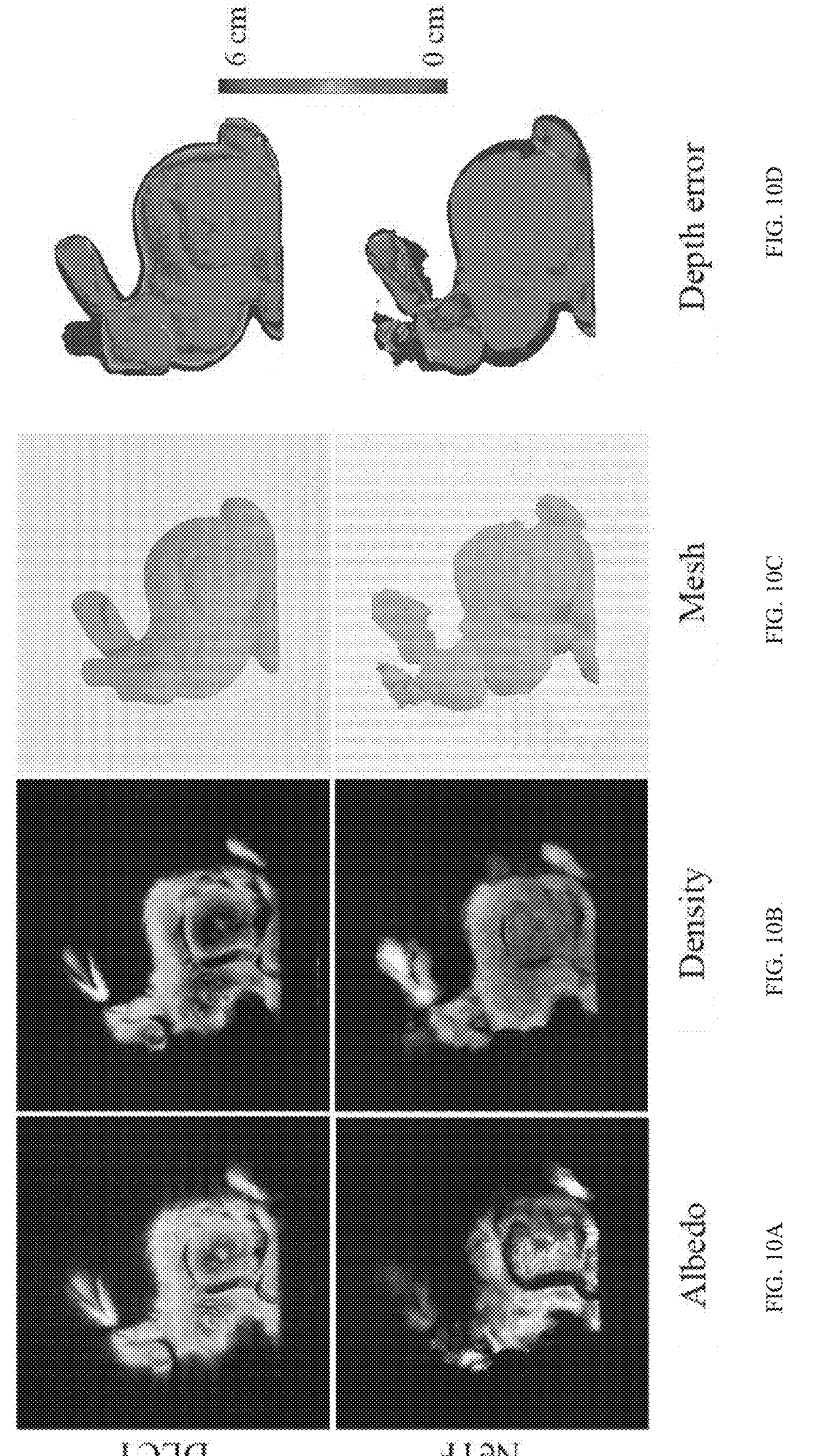
FIGS. 10A-10D show the comparison on the results of the Bunny model obtained by NeTF and DLCT.

The NeTF is trained using an MLP. FIG. 7 is a schematic diagram of the structure of the MLP used in NeTF. Referring to FIG. 7, analogous to NeRF, a fully connected network with nine 256-channel layers and one 128-channel layer is adopted in NeTF. The key differences are that (1) ReLU activation is used for all the layers in NeTF while sigmoid is used in NeRF, and that (2) the last four layers in NeRF are simplified into one layer in NeTF. The spherical coordinates of sampling points are transformed into their Cartesian coordinates $(x,y,z,\theta,\phi)$, and then fed into the MLP. The volume density is predicted as a function of position only, while the view-dependent reflectance is predicted as a function of both position and direction.

First, the spatial coordinates (x,y,z) and the viewing direction $(\theta,\phi)$ are normalized to range between [−1, 1]. Next, the positional encoding (PE) technique is applied and each input is mapped from 1 dimension onto a 10-dimensional Fourier domain to represent high-frequency variation in geometry and reflectance. Other dimensional domain may be used, and the preferred range of dimension is between 4 and 10. Third, the coordinates (x,y,z) are processed by the MLP as inputs with eight 256-channel layers and a 256-dimensional feature vector is outputed. For the reconstruction of a complex object, the channel size should be large enough to represent the object, and preferably be larger than 128. The coordinates (x,y,z) are also concatenated with the fourth layer for skip connection. Finally, this feature vector is passed to an additional 256-channel layer and $\sigma$ is produced. Simultaneously, the feature vector is concatenated with the direction $(\theta,\phi)$ and passed to the 128-channel layer for producing reflectance $\rho$.

Under the NLOS setting, a batch size of 1 to 4 transients is considered and 32×32 or 64×64 samples are employed for both uniform sampling $$N_c^2$$

and MCMC sampling $N_f$ on the hemisphere. The Adam optimizer is adopted with hyperparameters $\beta_1$=0.9, and $\epsilon$=1e−7. In the experiments, the learning rate begins at 1e−3 and decays exponentially to 1e−4 through the optimization. The training time of NeTF shares certain similarities to NeRF, In NeRF, the training cost depends on how densely to sample along each ray. In NeTF, the training cost depends on two factors, namely how densely to sample along the radius of the hemisphere (i.e., the number of layers) and how densely to sample each layer/hemisphere. For the Bunny scene, on a single Geforce RTX 3090 GPU, the training takes 10 hours using 200 layers with 32×32 samples on each layer (5 epochs, batch size 4). The training time quadruples with the same number of layers but at 64×64 samples.

7. Validations

The NeTF approach have been validated on two public NLOS datasets, including a simulated ZNLOS dataset, and a real Stanford dataset. ZNLOS consists of multi-bounce transients of synthetic objects that are 0.5 m away from the relay wall. The transients have a temporal resolution of 512 time bins with a width of 10 ps and a spatial resolution of 256× 256 pixels. The Stanford dataset captures transients measured in real scenes that are 1.0 m away from the relay wall. The transients in this dataset have a temporal resolution of 512 time bins with a width of 32 ps and a spatial resolution of 512×512 or 64×64 pixels. Quantitative and qualitative comparisons have been conducted between NeTF and the state-of-the-art (SOTA) methods.

7.1 Qualitative Comparisons

For the ZNLOS dataset, experiments have been conducted on several simulated hidden objects, including Bunny, Lucy, and Indonesian with a spatial resolution of 256× 256 pixels that correspond to an area of size 1 m×1 m on the relay wall. All these three models are diffuse. Bunny is not put on a floor, while Lucy and Indonesian are. For the Stanford dataset, experiments have been conducted on three real hidden objects made of different materials, including a diffuse Statue, a glossy Dragon, and a metal Bike. Their spatial resolution is 512×512 spots but is down-sampled to 256×256.

FIGS. 8A-8E show the results of the Lucy model and Statue model by NeTF according to an embodiment of the present invention. As shown in FIGS. 8A-8E, from left to right are the ground truth, recovered volume density, reflectance, albedo, and 3D mesh reconstruction using NeTF. The outputs of NeTF include a volume density map $\sigma$ and a directional reflectance map $\rho$ of ZNLOS Lucy and Stanford Statue. Based on these two maps, volumetric albedo can be produced and a 3D mesh of hidden objects can be reconstructed. By sampling 256× 256 transients, high quality reconstructions of objects with complex textures (e.g., Lucy) can be produced by NeTF. The density and reflectance maps of both Statue and Lucy, and the volumetric albedo contain much less error. Then the Marching Cubes algorithm is applied to further convert the volume to surfaces.

FIGS. 9A-9E show the comparison on the results of simulated NLOS dataset obtained by NeTF and SOTA, including three most broadly adopted volume-based methods Pharsor Field, F-K and DLCT. As shown in FIGS. 9A-9E, from left to right are the ground truth; and results obtained by Pharsor Field; F-K; DLCT; and NeTF. The comparison is based on the projected volumes to 2D maps of Indonesian, Lucy and Bunny. The results from F-K and Pharsor Field include volumetric albedos while NeTF includes both the density and the albedo maps. The normal volume using DLCT is also included here. The recovered volume maps on these hidden objects demonstrate that NeTF can achieve reconstruction quality comparable to SOTA. Additionally, NeTF can further tackle challenging geometry, e.g., the ear of Bunny, the wing of Lucy and the head of Indonesian that are partially missing when using the prior art. The Phasor Field technique achieves the best performance on Indonesian but misses the ear on Bunny and wing on Lucy. This implies that such geometry may bring additional challenges to wave-based techniques but can be potentially recovered via volume reconstruction. DLCT produces comparable results to NeTF on Bunny and Indonesian.

FIGS. 10A-10D show the comparison on the results of the Bunny model obtained by NeTF and DLCT, with respect to the recovered albedo, density, mesh reconstruction and depth error. For Bunny, both methods manage to acquire the overall geometry. However, one ear is missing by using DLCT while both ears are captured by NeTF. In FIGS. 9A-9E and 10A-10D, DLCT further uses the mask (silhouettes) of the Bunny to improve reconstruction to obtain the final mesh. The use of the mask can recover the shape (depth) of both ears but the geometry of the second ear is still incorrect. NeTF, in contrast, manages to recover both ears of Bunny. Similar reconstruction results can be observed on Lucy. NeTF preserves fine details but there's slightly more noise, as shown in the depth error. A similar phenomenon can be observed on NeRF for multi-view 3D reconstruction where the noise can be potentially filtered.

Figures 11A, 11B, 11C, 11D, 11E:
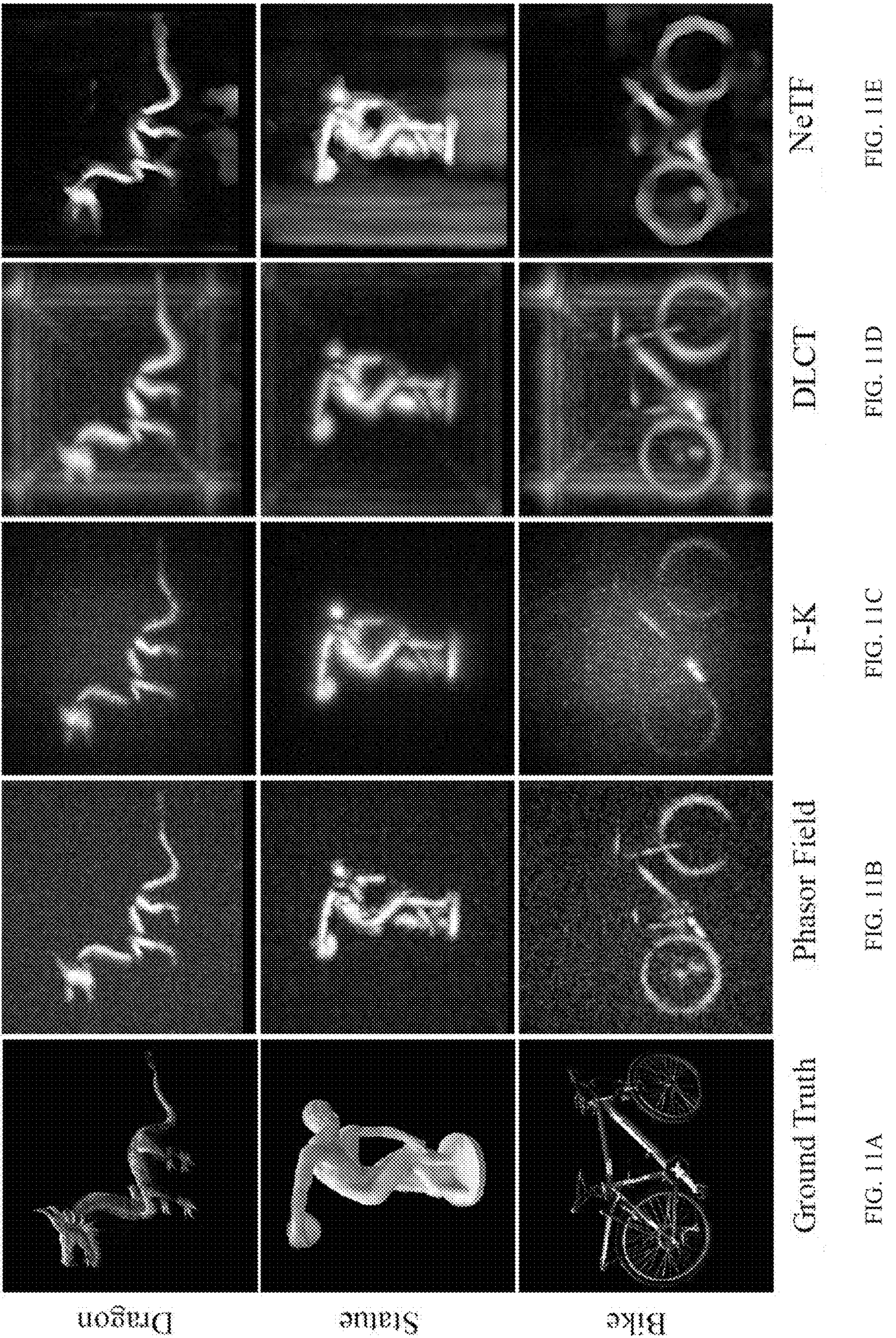
FIGS. 11A-11E show the comparison on the results of real NLOS dataset obtained by NeTF and SOTA.
Figures 12A, 12B, 12C, 12D:
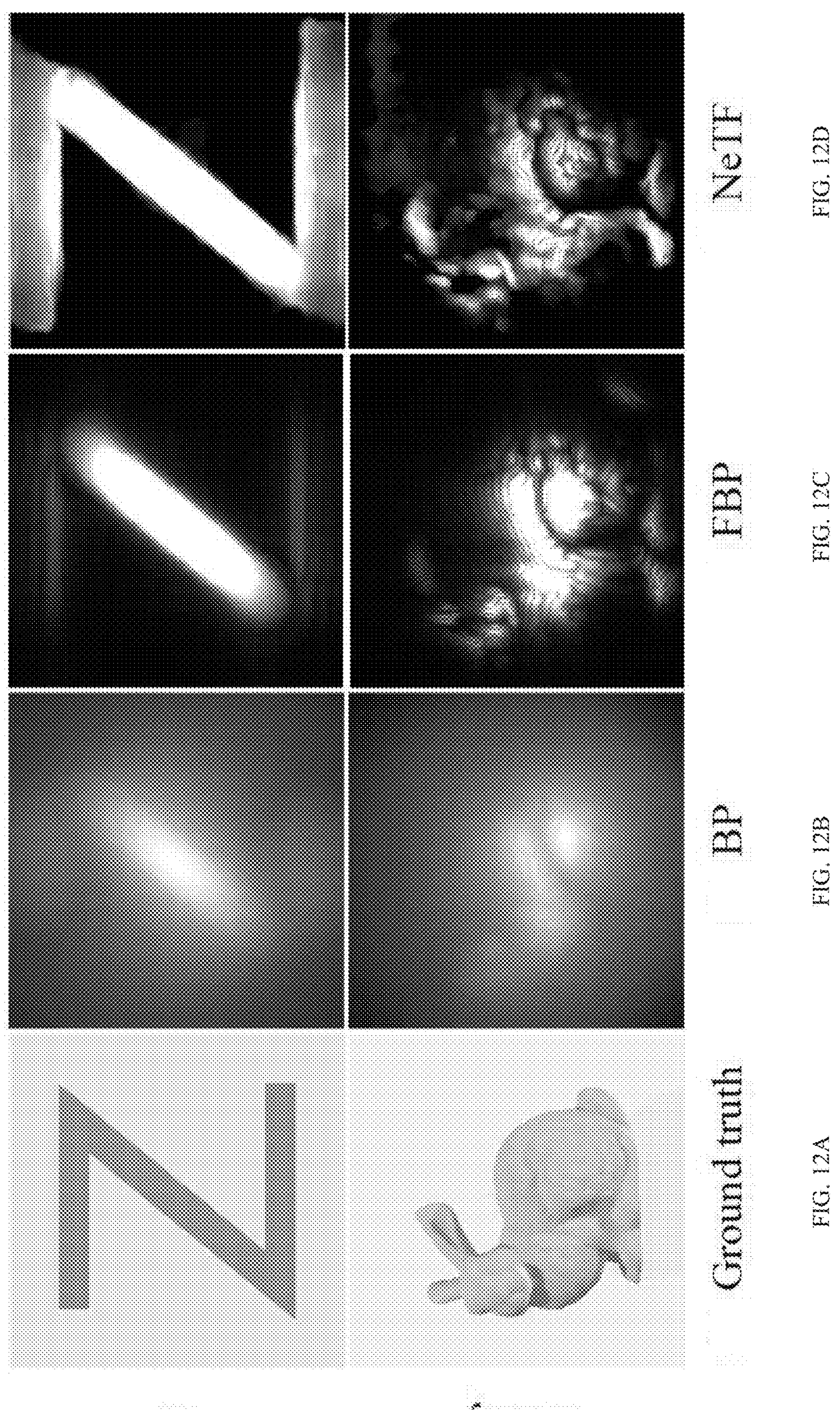
FIGS. 12A-12D show the comparison on NLOS reconstruction by NeTF and SOTA under the non-confocal setting.
Figures 13A, 13B, 13C, 13D:
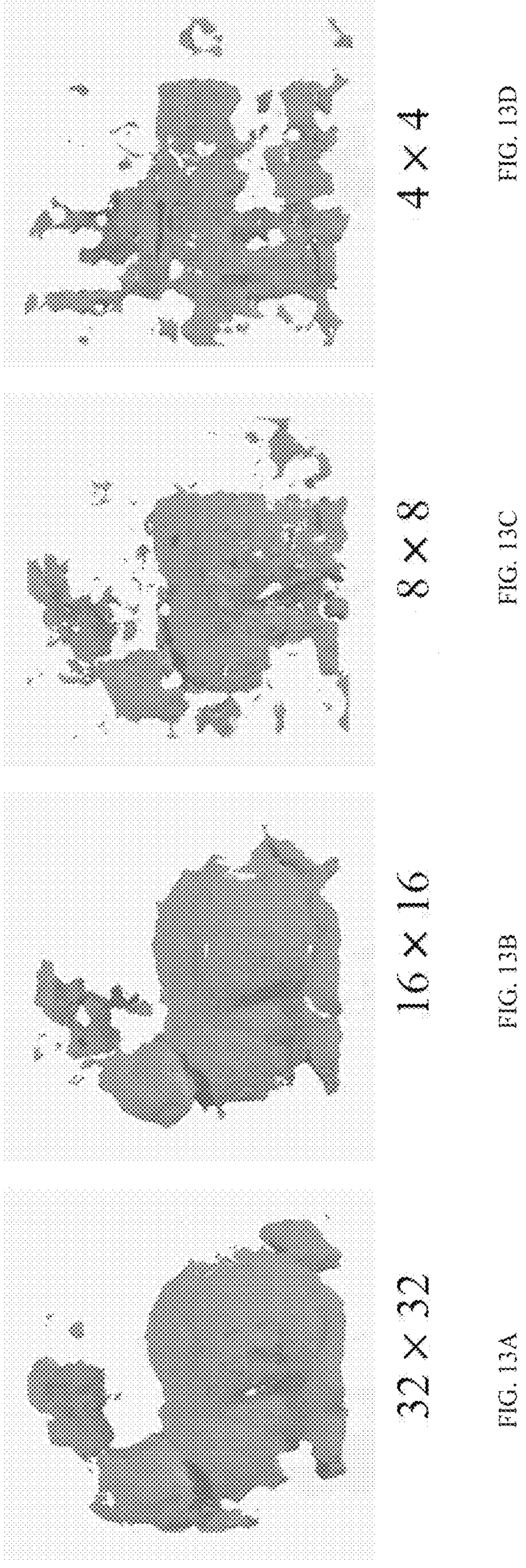
FIGS. 13A-13D show the NLOS reconstruction by NeTF with low resolution inputs.

FIGS. 11A-11E show the comparison on the results of real NLOS dataset obtained by NeTF and SOTA, for the glossy Dragon, diffuse Statue, and metal Bike. As shown in FIGS. 11A-11E, the ground truth shows a photography of the hidden object, FIGS. 11B-11D show results using various existing techniques including Phasor Field, F-K and DLCT, and FIG. 11E shows results using NeTF. For Dragon and Statue where view-dependency is relatively small, NeTF and SOTA produce comparable results, although NeTF manages to better preserve high frequency features such as occluding edges. For the challenging Bike scene exhibiting heterogeneous material and complex topology, NeTF achieves a similar performance to Phasor Field but with much lesser noise in the reconstruction. The reconstructed mesh produced by DLCT exhibits adhesion between different parts, while the reconstruction produced by NeTF manages to separate these parts.

To test NeTF under the non-confocal setting, experiments have been conducted on two additional objects from ZNLOS, i.e., the letter Z and the Bunny, and their transients simulated under non-confocal setups. FIGS. 12A-12D show the comparison on NLOS reconstruction by NeTF and SOTA including BP and FBP, under non-confocal settings. As shown in FIGS. 12A-12D, NeTF manages to recover clearer silhouettes than SOTA. In particular, NeTF produces reasonable estimations to the ground truth and significantly higher quality reconstruction compared with the results from BP and FBP.

FIGS. 13A-13D show the NLOS reconstruction by NeTF with low resolution inputs. Referring to FIGS. 13A-13D, FIGS. 13A-13D are the NeTF results with down-sampled measurements for simulated transients of Bunny at 32× 32, 16×16, 8×8 and 4×4 spots on the wall. Even with very sparse sampling spots (16× 16 and 8× 8), NeTF produces reasonable reconstructions.

Figures 14A, 14B, 14C, 14D, 14E, 14F:
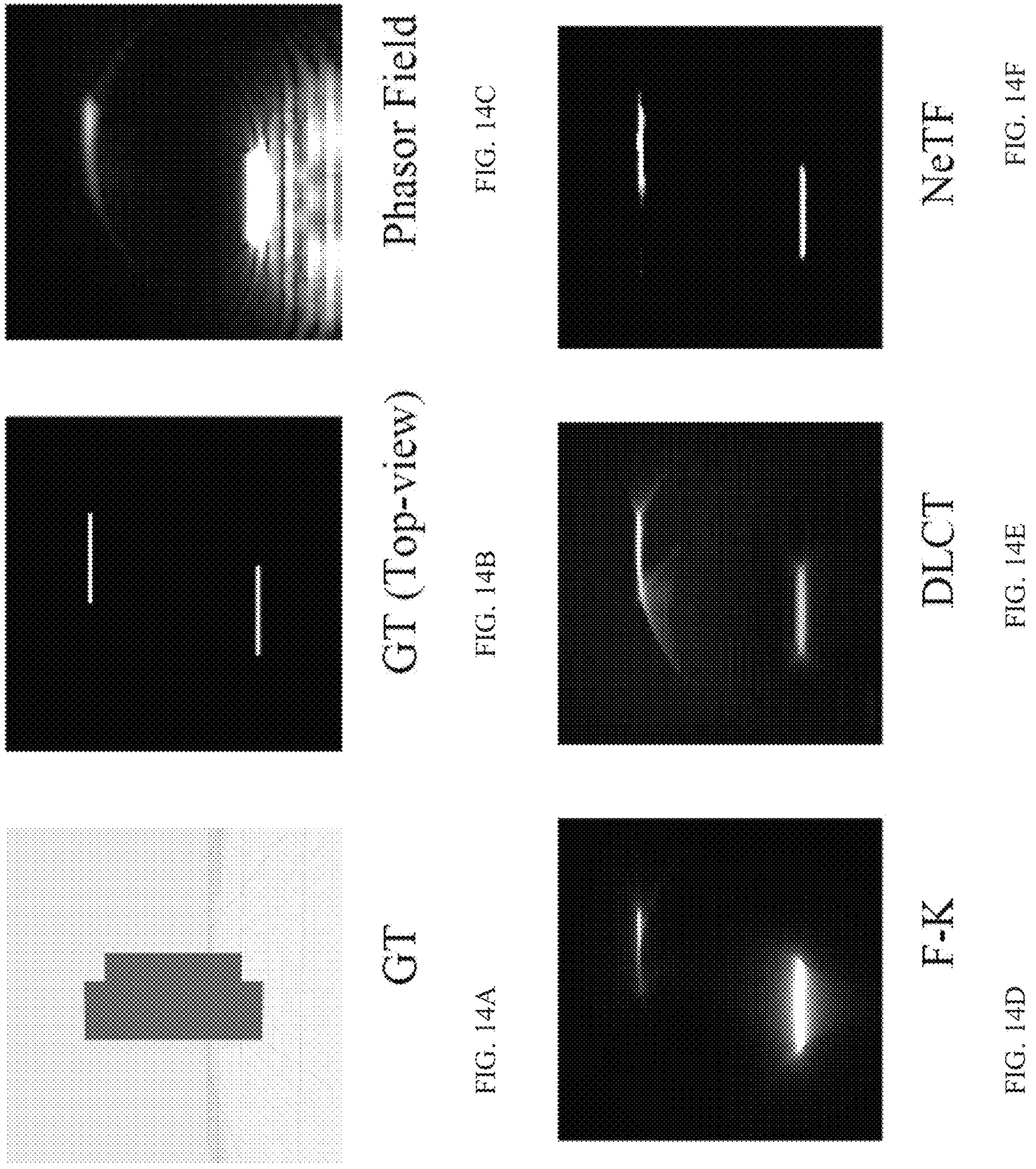
FIGS. 14A-14F show the comparison on NLOS reconstruction for a semi-occluded scene.

To further test on the robustness of NeTF vs. SOTA on occlusions, experiments have been conducted on a semi-occluded scene from ZNLOS using Eqn. 11. FIGS. 14A-14F show the comparison on NLOS reconstruction for a semi-occluded scene. FIGS. 14A-14B show the frontal and top-viewed albedo maps of the reconstruction. Phasor Field is most sensitive to occlusions while DLCT and F-K can only recover one plane at a high accuracy. NeTF produces sharper edges of both front and back planes. Closest to NeTF is DLCT, which manages to recover the front plane but produces high errors on the back plane.

7.2 Quantitative Comparisons

Table 1 and Table 2 show that NeTF achieves accuracy comparable to the state-of-the-art (SOTA) in terms of Mean Absolute Error (MAE), demonstrating the feasibility and efficacy of deep neural network for NLOS under both confocal and non-confocal settings.

Table 1 compares the reconstruction error using NeTF and SOTA on three confocal NLOS datasets measured by MAE. Under the MAE metric, the benefit of using NeTF does not seem significant. However, MAE does not fully reflect the reconstruction quality. For example, Phasor Field produces the highest MAE on Indonesian, indicating lowest reconstruction quality, yet it manages to recover many fine details largely missing in F-K and DLCT, as shown in FIGS. 9A-9E. The experiment results have further revealed that NeTF can handle silhouettes and semi-occlusions more robustly, as shown in FIGS. 12A-12D and 14A-14F.

Table 2 compares reconstruction error using NeTF and SOTA on two non-confocal NLOS datasets measured by MAE. As noted previously, low MAE does not sufficiently reflect reconstruction quality. For example, for the Z letter scene, NeTF performs slightly worse than FBP with respect to MAE but better preserves the silhouettes, as shown in FIGS. 12A-12D.

TABLE 1

| MAE | Bunny | Lucy | Indonesian |
|---|---|---|---|
| Phasor Field | 2.89 cm | 1.36 cm | 1.69 cm |
| F-K | 2.43 cm | 2.05 cm | 0.61 cm |
| DLCT | 2.38 cm | 0.23 cm | 0.30 cm |
| NeTF | 2.65 cm | 1.05 cm | 0.31 cm |

TABLE 2

| MAE | Bunny (non-confocal) | Z (non-confocal) |
|---|---|---|
| BP | 7.02 cm | 3.21 cm |
| FBP | 3.77 cm | 0.46 cm |
| NeTF | 7.45 cm | 0.60 cm |

8. Formulating LCT Via NeTF

LCT can be formulated as a simplified NeTF model. First, the forward model Eqn. 12 is rewritten under triple integrals with the Dirac delta function that correlates time of flight t with distance r:

$$\tau(x', y', t) = \Gamma_0 \int\int\int_{\Omega} \frac{\sin\theta}{r^2}\sigma(r, \theta, \phi)\rho(r, \theta, \phi)\,\delta\left(r - \frac{ct}{2}\right) d\ \mathrm{rd}\ \theta d\ \phi \tag{17}$$

where the integral domain Ω is defined under the spherical coordinates. Eqn. 17 is consistent with the light-cone transform (LCT) model, and can be rewritten, under the Cartesian coordinates where d xd yd z=$r^2$ sin θd rd θd ϕ, as:

$$\tau(x', y', t) = 2\Gamma_0 \int\int\int_{\Omega} \frac{1}{r^4}\sigma(x, y, z) \tag{18}$$

-continued $$\rho(x, y, z, \theta, \phi)\cdot\delta\left(2\sqrt{(x-x')^2 + (y-y')^2 + z^2} - ct\right) d\ xd\ \mathrm{yd}\ z$$

If the diffuse and isotropic albedo are assumed as $\rho_{iso}$(x, y,z)=σ(x,y,z)ρ(x,y,z,θ,ϕ), Eqn. 18 can be degenerated to the LCT model (which equals to Eqn. 4 with g=1).

9. Non-Confocal NeTF

Figure 15:
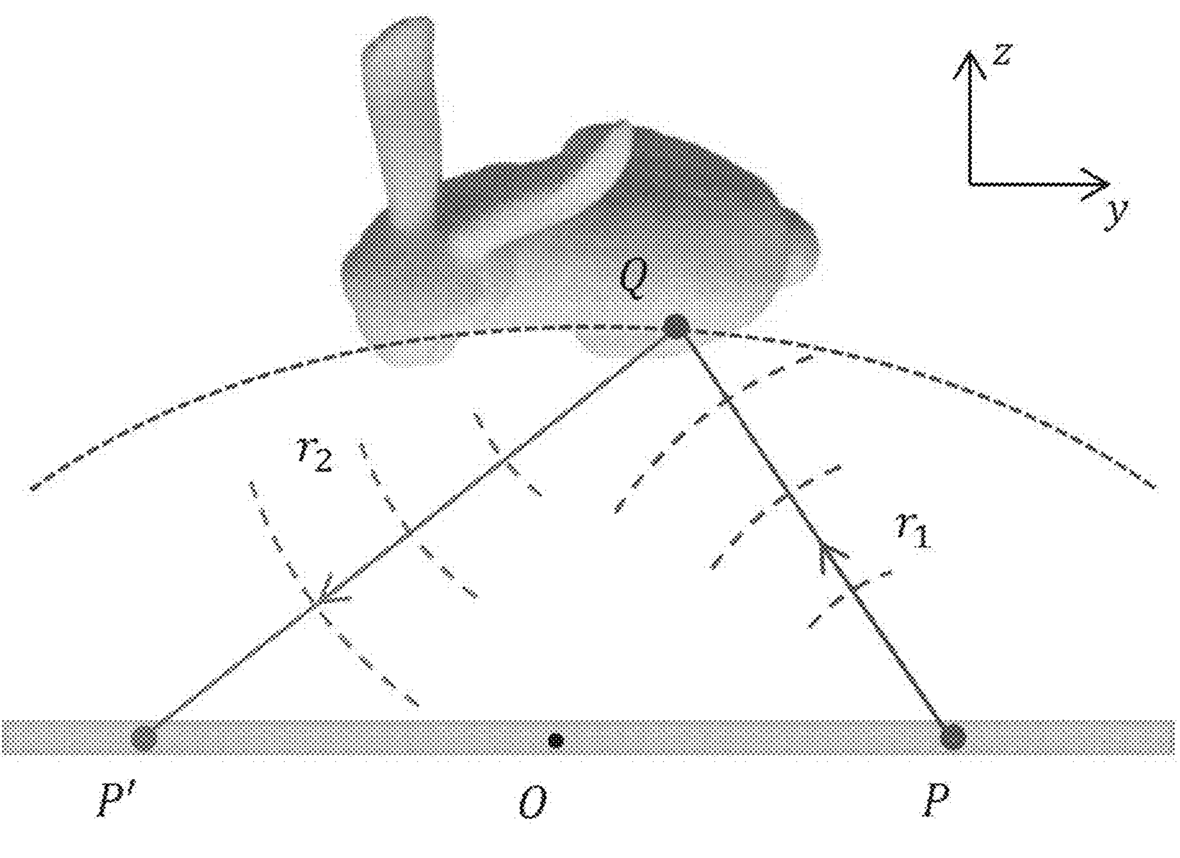
FIG. 15 is a schematic diagram of non-confocal NLOS imaging.

FIG. 15 is a schematic diagram of non-confocal NLOS imaging. Referring to FIG. 15, under the non-confocal setting, the transient can be formulated in terms of semi-ellipsoids with foci at the illumination spot P and detection spot P' on the relay wall. With respect to a given scene point Q, $r_1$ and $r_2$ correspond to the distance from P to Q and Q to P', respectively. Following the same derivation of Eqns. 6, 7, and 8 under the confocal setting, the energy (transient) received at P' from the location Q can first be computed as:

$$E_{P'} = \frac{\Gamma}{r_2^2}\sigma(Q)\rho(Q, P, P')\exp\left(-A\int_Y \sigma(s)ds\right)d\Omega \tag{19}$$

where $$\Gamma = Aarr_0^2 E_p/\pi\cdot\exp\left(-A\int_Y \sigma(s)ds\right)$$

corresponds to the attenuation coefficient along optical path Y: P→Q→P' with length $r_1$+$r_2$=ct.

To compute the complete transient received at P' from P, it should be noted that P' should be radiated by all points lying on a semi-ellipsoid E with the foci P, P', semi-major axis of length α=ct/2, focal length $\gamma=|\overrightarrow{OP}-\overrightarrow{OP'}|$, and the eccentricity e=γ/α. For simplicity, the coordinate system can be set up so that P and P' are symmetric about origin O and $\overrightarrow{PP'}$ parallel to y-axis. Thus the transient can be computed as:

$$\tau(P, P', t) = \int\int_E E_{p'} d\ \Omega \tag{20}$$

Since Eqn. 19 is integrated on the semi-ellipsoid E but under spherical coordinates centered at P, E need to be rewrited under ellipsoidal coordinates with foci P and P'. Specifically, the ellipsoid is represented in terms of $r_1$ and θ as:

$$r_1 = \frac{\alpha(1-e^2)}{1-e\cos\theta} \tag{21}$$

Then Eqn. 20 is transformed to:

$$t(P, P', t) = \int\int\int_{\Omega} E_P\cdot\delta\left(r_1 - \frac{\alpha(1-e^2)}{1-e\cos\theta}\right) d\ r_1 d\ \Omega \tag{22}$$

Next, spherical coordinates ($r_1$,θ,ϕ) are transformed to ellipsoidal coordinates (μ,ν,φ) as:

$$r_1\sin\theta\cos\phi = \gamma\sinh\mu\sin\nu\cos\varphi \quad (23)$$

$$r_1\sin\theta\sin\phi = \gamma\sinh\mu\sin\nu\sin\varphi$$

$$r_1\cos\theta = \gamma\cosh\mu\cos\nu$$

The Jacobian J from the Cartesian to ellipsoidal coordinates is:

$$J = \frac{d\ xd\ yd\ z}{d\ \mu d\ \nu d\ \varphi} = \gamma^3\sinh\mu\sin\nu\left(\sinh^2\mu + \sin^2\nu\right) \quad (24)$$

Spherical coordinates can be mapped to ellipsoidal coordinates via/as:

$$d\ xd\ \text{y}d\ z = r_1^2\sin\theta d\ r_1 d\ \theta d\ \phi = r_1^2 d\ r_1 d\ \Omega = Jd\ \mu d\ \nu d\ \varphi \quad (25)$$

Substituting Eqn. 25 into Eqn. 22, the transient under the ellipsoidal coordinate system can be rewritten as:

$$\tau(P, P', t) = \int\int\int_{\Omega} \frac{1}{r_1^2} E_P \cdot \delta(2\gamma\cosh\mu - ct) J d\mu d\nu d\varphi$$

Notice that with a fixed t, the corresponding μ for nonzero δ can be obtained so that the triple integrals can be simplified to double integrals of only ν and φ. In addition, if further discarding the attenuation term in $E_{P'}$, the transient can be further simplified to:

$$\tau(P, P', t) = \Gamma_0 \int\int_{E} \frac{J}{r_1^2 r_2^2} \sigma(\mu, \nu, \varphi)\rho(\mu, \nu, \varphi, P, P') d\nu d\varphi$$

where μ=arccosh(ct/2γ). A downside of discarding attenuation is that occlusions are ignored.

10. Conclusion

A novel neural modeling framework Neural Transient Field (NeTF) is provided for non-line-of-sight (NLOS) imaging. Similar to the recent Neural Radiance Field that seeks to use a multi-layer perceptron (MLP) to represent the 5D radiance function, NeTF recovers the 5D transient function in both spatial location and direction. Different from NeRF, the training data input is parametrized on the spherical wavefronts in NeTF rather than parametrized along lines (rays) as in NeRF. Therefore, the NLOS process is formulated under spherical coordinates, analogous to volume rendering under Cartesian coordinates. Another unique characteristic of NeTF is the use of Markov chain Monte Carlo (MCMC) to account for sparse and unbalanced sampling in NeTF. MCMC enables more reliable volume density estimation and produces more accurate shape estimation by recovering missing details caused by occlusions and non-uniform albedo. Experiments on both synthetic and real data demonstrate the benefits of NeTF over

What is claimed is:

1. A computer-implemented method for imaging a non-line-of-sight (NLOS) scene, comprising:

encoding, by a computing system, a neural transient field onto a Multi-Layer Perceptron (MLP), wherein the neural transient field represents the NLOS scene as a continuous 5D function of transient;

feeding a plurality of transient pixels captured by a time-resolved detector from a plurality of detection spots on a relay wall to the MLP;

outputting a volume density and a surface reflectance along a direction by the MLP in accordance with the plurality of transient pixels; and reconstructing the NLOS scene in accordance with the volume density and the surface reflectance.

2. The computer-implemented method according to claim 1, wherein each of the plurality of transient pixels is parameterized using spherical coordinates with respect to the detection spot on the relay wall, and the method further comprises:

transforming the spherical coordinates of the plurality of transient pixels into corresponding Cartesian coordinates.

3. The computer-implemented method according to claim 1, further comprising:

employing positional encoding (PE) technique to map each of the plurality of transient pixels to a multiple dimensional Fourier domain.

4. The computer-implemented method according to claim 3, wherein the multiple dimensional Fourier domain is in a range of 4 to 10.

5. The computer-implemented method according to claim 1, wherein the MLP comprises nine 256-channel layers and one 128-channel layer.

6. The computer-implemented method according to claim 1, further comprising:

outputting a feature vector.

7. The computer-implemented method according to claim 1, further comprising:

reconstructing the NLOS scene in accordance with $$\tau(x', y', t) = \Gamma_0 \int\int_{H\left(x', y'; \frac{ct}{2}\right)} \frac{\sin\theta}{r^2} \sigma(r, \theta, \phi; x', y')\rho(r, \theta, \phi; x', y') \cdot \exp\left(2\int_0^r -A\sigma d\ r'\right) d\ \theta d\ \phi$$

wherein τ(x',y',t) represents the transient at a time instant t;

$$\Gamma_0 = Aar_0^2 E_P/\pi$$

corresponds to a constant term of particle radius a, initial energy $E_P$, and patch radius $r_0$; an integration domain $$H\left(x', y'; \frac{ct}{2}\right)$$

is a hemisphere centered at the detection spot P(x';y') on the relay wall with a radius of $$r = \frac{ct}{2};$$

θ and ϕ and azimuth in a direction from P(x';y') to the transient pixel; σ(r,θ,ϕ;x',y') represents the density; and ρ(r,θ,ϕ;x',y') models the surface reflectance.

8. The computer-implemented method according to claim 1, further comprising:

reconstructing the NLOS scene in accordance with $$\tau(x', y', t) = \Gamma_0 \iint_{H\left(x', y'; \frac{ct}{2}\right)} \frac{\sin\theta}{r^2} \sigma(r, \theta, \phi; x', y') \rho(r, \theta, \phi; x', y') d\theta d\phi.$$

9. The computer-implemented method according to claim 1, further comprising:

reconstructing the NLOS scene in accordance with $$\tau(P, P, t) = \iiint_{\Omega} \frac{1}{r_1^2} E_{P'} \delta(2\gamma\cosh\mu - ct) J d\mu dv d\varphi$$

wherein τ(P,P',t) represents the transient at the time instant t; P and P' represent a illumination spot and the detection spot on the relay wall, respectively; with respect to a NLOS scene point Q, $r_1$ and $r_2$ correspond to a distance from P to Q and Q to P', respectively; a length of optical path Y: P→Q→P' equals to $r_1+r_2=ct$; focal length is $\gamma=|\overrightarrow{OP}-\overrightarrow{OP'}|$; $E_{P'}$ represents an energy received at P' from Q; (μ,ν,φ) are ellipsoidal coordinates; and J represents Jacobian from Cartesian coordinates.

10. The computer-implemented method according to claim 1, further comprising:

reconstructing the NLOS scene in accordance with $$\tau(P, P', t) = \Gamma_0 \iint_{E} \frac{J}{r_1^2 r_2^2} \sigma(\mu, v, \varphi) \rho(\mu, v, \varphi, P, P') dv d\varphi$$

wherein μ=arccosh(ct/2γ).

11. The computer-implemented method according to claim 1, further comprising:

predicting the plurality of transient pixels based on the volume density and the surface reflectance.

12. The computer-implemented method according to claim 11, further comprising:

calculating a loss function between estimated transient pixels and captured transient pixels.

13. The computer-implemented method according to claim 12, further comprising:

capturing a plurality of new transient pixels by the time-resolved detector from a plurality of new detection spots on the relay wall in accordance with the loss function as a probability density function (PDF);

feeding the plurality of new transient pixels captured to the MLP;

outputting the volume density and the surface reflectance along the direction by the MLP in accordance with the plurality of new transient pixels; and reconstructing the NLOS scene in accordance with the volume density and the surface reflectance.

14. The computer-implemented method according to claim 13, wherein a decreasing speed of the loss function is less than $(L_i-L_{i+1})/L_i<10^{-4}$, wherein L represents the loss function.

15. The computer-implemented method according to claim 1, further comprising:

selecting a plurality of first transient pixels from the plurality of transient pixels and sampling the plurality of first transient pixels by the MLP;

predicting the plurality of first transient pixels based on the volume density and the surface reflectance;

calculating the loss function between estimated first transient pixels and captured first transient pixels; and selecting a plurality of second transient pixels from the plurality of transient pixels and sampling the plurality of second transient pixels in accordance with the loss function as a PDF.

16. The computer-implemented method according to claim 15, further comprising:

outputting the volume density and the surface reflectance along the direction by the MLP in accordance with the plurality of second transient pixels; and reconstructing the NLOS scene in accordance with the volume density and the surface reflectance.

17. The computer-implemented method according to claim 16, wherein the operation of selecting the plurality of second transient pixels from the plurality of transient pixels further comprises:

employing a Markov chain Monte Carlo (MCMC) algorithm in accordance with:

$$\tau_f(x', y', t) = \frac{1}{r^4} \sum_{i,j} \frac{\sigma(r, \theta_{f,ij}, \phi_{f,ij}; x', y') \rho(r, \theta_{f,ij}, \phi_{f,ij}; x', y')}{K(\theta_{f,ij}, \phi_{f,ij})}$$

wherein $\tau_f(x',y',t)$ is the transient based on the second transient pixels; $K(\theta_{f,ij},\phi_{f,ij})$ is the PDF; $\sigma(r,\theta_{f,ij},\phi_{f,ij};x',y')$ represents the density; and $\rho(r,\theta_{f,ij},\phi_{f,ij};x',y')$ models the surface reflectance.

18. The computer-implemented method according to claim 17, further comprising:

reconstructing the NLOS scene using the first transient pixels and the second transient pixels in accordance with:

$$\tau(x', y', t) = \frac{\tau_c(x', y', t) + \tau_f(x', y', t)}{2}$$

wherein $\tau_c(x',y',t)$ is the transient based on the first transient pixels.

* * * * *